(12) United States Patent
Efird

(10) Patent No.: US 10,474,984 B2
(45) Date of Patent: Nov. 12, 2019

(54) VEHICLE CONTROL SYSTEM AND METHOD

(71) Applicant: General Electric Company, Schenectady, NY (US)

(72) Inventor: Nanette Efird, Atlanta, GA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 465 days.

(21) Appl. No.: 15/055,567

(22) Filed: Feb. 27, 2016

(65) Prior Publication Data

US 2016/0253642 A1 Sep. 1, 2016

Related U.S. Application Data

(60) Provisional application No. 62/126,305, filed on Feb. 27, 2015.

(51) Int. Cl.
*G07F 19/00* (2006.01)
*G06Q 10/08* (2012.01)

(52) U.S. Cl.
CPC .................. *G06Q 10/0835* (2013.01)

(58) Field of Classification Search
CPC .................................... G06Q 10/0835
USPC ...................................... 705/16, 34
See application file for complete search history.

(56) References Cited

U.S. PATENT DOCUMENTS

| 2008/0258936 | A1* | 10/2008 | Chitor | G07B 15/063 340/933 |
| 2014/0026089 | A1* | 1/2014 | Linton | G06F 3/04842 715/765 |
| 2014/0089030 | A1 | 3/2014 | Bell | |
| 2014/0089031 | A1 | 3/2014 | Bell | |
| 2014/0089032 | A1 | 3/2014 | Bell | |
| 2015/0051941 | A1 | 2/2015 | Bell | |

* cited by examiner

*Primary Examiner* — Rokib Masud
(74) *Attorney, Agent, or Firm* — Joseph F. Harding; The Small Patent Law Group, LLC

(57) ABSTRACT

A control system includes a sensor or other input device and one or more processors configured to receive event data associated with a vehicle from the sensor. The one or more processors also are configured to receive a designated chargeable usage of the vehicle and to determine one or more rules dictating rule-based chargeable usage of the vehicle based on the event data. The one or more processors compare the event data with the one or more rules to determine the rule-based chargeable usage of the vehicle and compare the rule-based chargeable usage with the designated chargeable usage to identify one or more discrepancies between the rule-based chargeable usage and the designated chargeable usage. The one or more rules dynamically change with changing conditions of the vehicle. The one or more processors are configured to generate control signals based on the rule-based chargeable usage and/or the identified discrepancies.

22 Claims, 10 Drawing Sheets

VEHICLE CONTROL SYSTEM AND METHOD

CROSS-REFERENCE TO RELATED APPLICATIONS

This application claims priority to U.S. Provisional Application Ser. No. 62/126,305, filed 27 Feb. 2015, the entirety of which is incorporated herein by reference.

TECHNICAL FIELD

Embodiments of the subject matter disclosed herein relate to vehicles, vehicle usage, and vehicle control.

BACKGROUND

In logistics, and particularly freight transport, costs can vary according to a timing of events. Excess fees can be leveraged for events that are delayed beyond an allotted time. Similarly, credits or discounts can be earned for events that transpire quickly. In freight transports, for example, various vehicles can be utilized by shippers for the transportation of goods and cargo. These vehicles can be leased to shippers by owners and delivered, to the shippers, by carriers for utilization by the shippers.

Extra costs can be incurred by shippers for elapsed time while vehicles are loaded and/or unloaded. Additionally, costs can accrue for vehicles that are available for loading and/or unloading, but that are undeliverable to the shippers for loading and/or unloading due to limited capacities of the shippers. These elapsed times are generally defined as time periods that begin when vehicles are delivered to the shippers for action by the shippers and that end when the vehicles are released back to carriers or owners, and are often referred to as demurrage or storage.

Various events or circumstances surrounding delivery and release of vehicles can affect the costs associated with demurrage and/or storage. Thus, procedures followed in management of vehicles can impact overall costs to shippers for the transportation of goods and cargo.

BRIEF DESCRIPTION

In one embodiment, a control system (e.g., a vehicle control system) includes at least one electronic input device (e.g., sensor) that is configured to generate event data associated with a vehicle. The at least one electronic input device is positioned along a route of the vehicle and the event data relates to movement of the vehicle. The system further includes one or more processors communicatively coupled with the electronic input device and configured to receive the event data from the electronic input device. The one or more processors are also configured to receive a designated chargeable usage of the vehicle and to determine one or more rules dictating rule-based chargeable usage of the vehicle based on the event data. The one or more processors are also configured to compare the event data with the one or more rules to determine the rule-based chargeable usage of the vehicle and to compare the rule-based chargeable usage with the designated chargeable usage to identify one or more discrepancies between the rule-based chargeable usage and the designated chargeable usage. The one or more rules that dictate the rule-based chargeable usage dynamically change with changing conditions of the vehicle. At least one of the one or more processors is further configured to generate control signals for controlling movement of the vehicle based on at least one of the rule-based chargeable usage of the vehicle or the one or more discrepancies that are identified.

In one embodiment, a control system includes one or more processors configured to obtain event data associated with a vehicle. The one or more processors also are configured to receive a designated chargeable usage of the vehicle and to determine one or more rules dictating rule-based chargeable usage of the vehicle based on the event data. The one or more processors compare the event data with the one or more rules to determine the rule-based chargeable usage of the vehicle and compare the rule-based chargeable usage with the designated chargeable usage to identify one or more discrepancies between the rule-based chargeable usage and the designated chargeable usage. The one or more rules that dictate the rule-based chargeable usage dynamically change with changing conditions of the vehicle.

In one embodiment, a method includes obtaining event data associated with a vehicle, receiving a designated chargeable usage of the vehicle, determining one or more rules dictating rule-based chargeable usage of the vehicle based on the event data, comparing the event data with the one or more rules to determine the rule-based chargeable usage of the vehicle, comparing the rule-based chargeable usage with the designated chargeable usage to identify one or more discrepancies between the rule-based chargeable usage and the designated chargeable usage (where the one or more rules that dictate the rule-based chargeable usage dynamically change with changing conditions of the vehicle), and, responsive to identifying the one or more discrepancies, changing one or more of a condition or state of the vehicle.

In one embodiment, a control system includes one or more processors configured to obtain event data associated with a vehicle. The one or more processors are configured to receive a designated chargeable usage of the vehicle and to determine one or more rules dictating rule-based chargeable usage of the vehicle based on the event data. The one or more processors are configured to identify different sets of the one or more rules that dynamically change and to combine two or more of the different sets of the one or more rules based on a type of the vehicle, a type of cargo carried by the vehicle, and/or a user of the vehicle to determine the rule-based chargeable usage. The one or more processors are configured to compare the event data with the one or more rules to determine the rule-based chargeable usage of the vehicle and to compare the rule-based chargeable usage with the designated chargeable usage. The one or more rules that dictate the rule-based chargeable usage dynamically change with changing conditions of the vehicle.

BRIEF DESCRIPTION OF THE DRAWINGS

Reference is made to the accompanying drawings in which particular embodiments and further benefits of the inventive subject matter are illustrated as described in more detail in the description below, in which.

DETAILED DESCRIPTION

Figure 1:
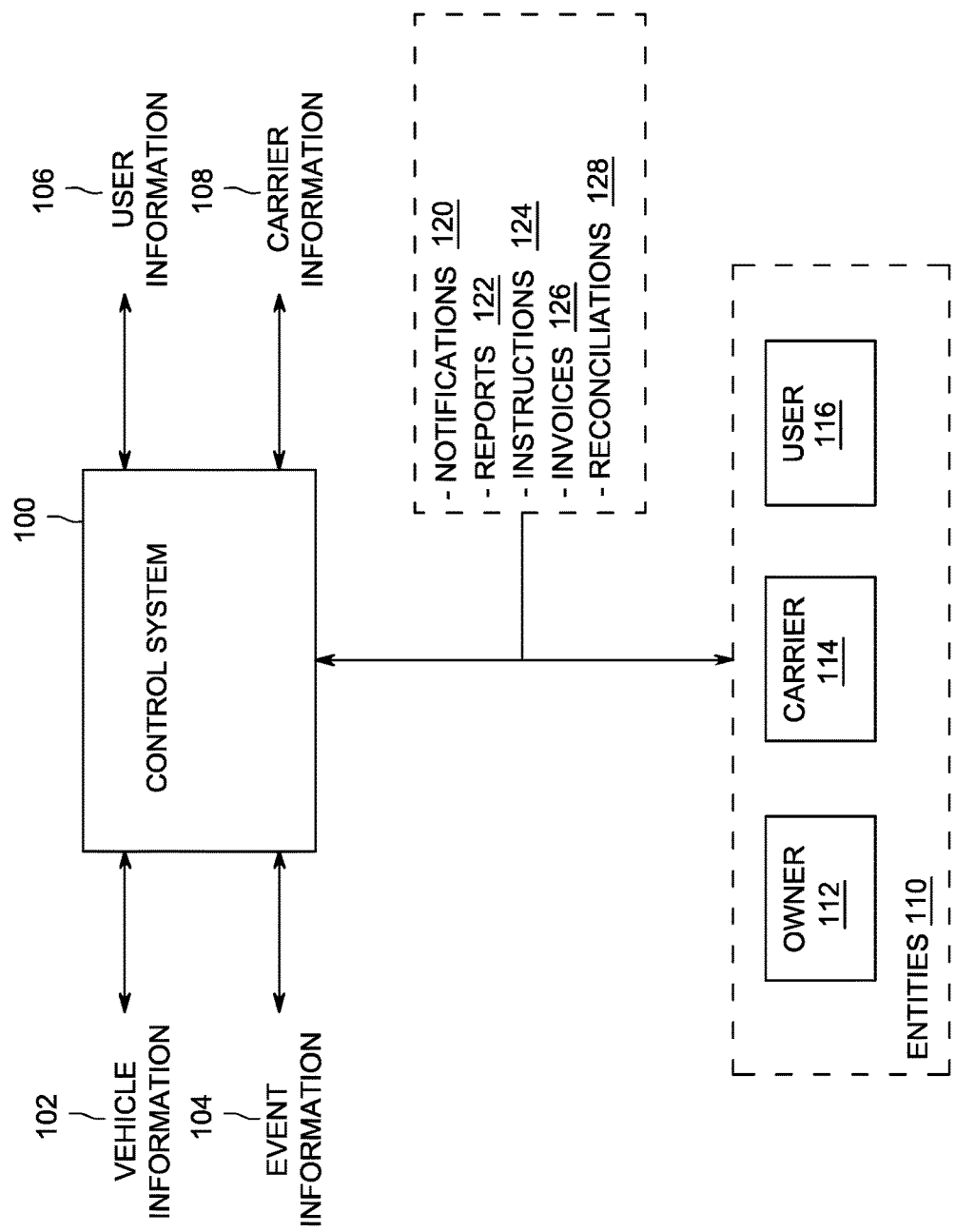
FIG. 1 illustrates a schematic block diagram of one embodiment of a control system (e.g., demurrage management system)

Embodiments described herein generally relate to systems and methods for controlling vehicles, e.g., managing utilization of vehicles. The embodiments described can be applicable to management of vehicles employed in freight transport to provide accurate charges for usage of the vehicles. In particular, embodiments provide mechanisms to provide and support accurate charging for demurrage or storage of the vehicles. In freight transport, for instance, a time period subject to demurrage charges can be determined based on a time that a vehicle is provided to a shipper and a time that the vehicle is released back to an owner or carrier. For storage of the vehicles, the time period subject to charges can be determined based on a time the vehicle becomes available for placement with the shipper and the time the vehicle is actually placed with the shipper, for example. While placement and release (availability for placement and actual placement) generally define a time span subject to charges, various other events or circumstances related to the vehicle can alter the time span and, therefore, affect charges incurred.

Control systems and methods (e.g., demurrage management systems and methods) described herein reduce manual and laborious efforts to track vehicle movement, determine expected charges, and audit received invoices. Additionally, the demurrage management systems and methods herein enable fluid definition of demurrage characteristics and accurate invoicing of usage of vehicles. Further, the systems and methods described facilitate correction of errors or other discrepancies in actual invoices associated with vehicle usage.

A "vehicle," as utilized herein, includes one or more physical objects collectively employable to transport and/or store goods or cargo, either independently or with assistance from another machine or component. By way of example, vehicles can include, without limitation, self-propelling vehicles, vehicles incapable of propelling themselves, containers, or combinations thereof. For instance, a container detachably coupled to one or more vehicles for conveyance can collectively be a vehicle system. As utilized herein, a "container" includes an object that can hold or support another object such as a good, cargo, or another container. The vehicles can include containers conveyable via any transportation system including, but not limited to, systems for transport on ground (e.g., motorcycles, automobiles, trucks, busses, rail transport, etc.), watercraft (e.g., boats, ships) for transport on water, or aircraft (e.g., planes, rotorcrafts) for transport in air. A vehicle can be a single-compartment, permanently-arranged container conveyable via a transportation system. In rail transport, for instance, one form of a vehicle is a railcar. Other examples of vehicles include a ship, a semi-trailer, or an aircraft.

In one embodiment, a vehicle refers to a unit train. A unit train includes a rail vehicle system formed from two or more vehicles that conveys a single type of cargo or commodity. For example, a rail vehicle system having one or more locomotives and one or more railcars carrying the same type of cargo (e.g., coal, oil, milk, passengers, mail, etc.) can be a unit train.

A vehicle optionally can include a multiple-compartment, variably-arranged structure conveyable via a transportation system. Thus, a vehicle can include one or more component containers or vehicles, which are respectively interchangeably and detachably coupled to form, collectively, an asset. Accordingly, another form of a vehicle is a consist, which refers to plural vehicles linked for coordinated transport, such as a train of railcars or group of trailers, for example.

Usage of vehicles refers to one or more operations performed on or concerning vehicles, or any other interactions with or concerning vehicles. For instance, usage can include loading and unloading of goods and cargo to and from a vehicle. This type of usage can be referred to as demurrage.

Usage can also include holding or detaining a vehicle at a location. Demurrage can also include this type of usage; however, when disassociated from loading/unloading, can be referred to as storage. Vehicles can be rented or leased such that vehicle usage can be performed by entities other than vehicle owners. Such usage can be chargeable, e.g., subject to a charge, according to an amount of time the vehicle remains in possession of or available to the entities to perform the usage. A charge refers to an amount of an exchangeable object having a value. For example, a charge can be a monetary sum.

A time period over which usage of a vehicle is chargeable can be determined or monitored based on events associated with the vehicle. An event can reflect a status change for the vehicle where the vehicle transitions from a first state to a second state. In some states, chargeable time accrues. Accordingly, certain events operate to start a clock while other events operate to suspend or terminate the clock. Starting the clock can represent when charges for the vehicle start to accrue, while suspending or terminating the clock represent when the charges at least temporarily stop accruing for the vehicle.

Which states accrue chargeable time and which states do not accrue charges (and in turn which events respectively start, suspend, and terminate the clock) can be determined according to a set of rules. In an example, the set of rules can be rules tariff established by a carrier responsible for the transport of goods and cargo. In this example, the set of rules can be associated with the carrier such that all users of vehicles transported by the carrier are subject to similar rules. According to other examples, the set of rules can be respectively associated with a specific user, a specific vehicle, and/or a specific vehicle owner such that the set of rules are applied for that user, vehicle, and/or owner. To associate a charge to a period of time, a second set of rules can be employed. The second set of rules can be referred to, in some examples, as a billing schedule. The second set of rules can be a subset of the set of rules utilized to determine an amount of chargeable time.

Owners, carriers, and users can refer to particular roles or relationships with respect to a vehicle. An owner holds title to the vehicle and may have the ability to lease or rent the vehicle to others. A carrier may be responsible for transporting the vehicle or other cargo via one or more transportation systems. The carrier can deliver vehicles to users and/or pick up vehicles from users. A user may utilize the vehicle to hold or support goods or cargo for transportation by the carrier. These roles can be occupied by distinct entities, or one entity can inhabit more than one role. For instance, the carrier responsible for transport of the vehicle can also be the owner of the vehicle. In this instance, the user can be liable for charges when the vehicle is held in possession of or available to the user. In another example, the user of the vehicle can be the owner such that the user is liable for charges when the carrier makes accommodations to hold the vehicle at a location.

According to one or more embodiments of the inventive subject matter described herein, a control system (e.g., demurrage management system) monitors liabilities incurred by or owed to by users, owners, and carriers with respect to vehicles and verifies accurate billing for those liabilities. The control system tracks events associated with a vehicle or vehicles. With information corresponding to the events, the control system determines an amount of chargeable usage by the user. The amount of chargeable usage can be determined based on a set of rules (e.g., tariff rules), which can be universal set or a set respectively associated with at least of the user, a carrier, an owner, or the vehicle. The control system applies the set of rules to a timeline of events, as indicated by event data or event information collected, to generate the amount of chargeable usage. An expected charge or invoice amount can be generated based on the amount of chargeable usage and a second set of rules. The second set of rules can be a subset of the set of rules employed to generate the amount of chargeable usage, or a separate set of rules such as a billing schedule, for example.

The control system (e.g., demurrage management system) can receive an invoice from an owner or carrier for usage of the vehicle. The invoice is compared to the expected charge and/or the amount of chargeable usage to identify one or more discrepancies (e.g., differences). The discrepancy can relate to a difference between an invoiced amount and the expected charge, a difference between a usage time stated on the invoice and the determined chargeable usage, or both. Discrepancies can arise, for example, when an owner or carrier does not make allowances for particular events or circumstances when preparing the invoice. The control system can generate a report, based on the event data, to support a correction request to the owner and/or the carrier.

In a rail transport example, the user can be a shipper of goods or cargo and the carrier can be a railroad servicing the shipper with transportation by rail. In this context, a vehicle can be a railcar or a container in association with a railcar. The owner of the vehicle can be either the railroad or the shipper, which respectively implicate different subsets of rules in determinations of chargeable usage of the vehicle. For instance, pursuant to this example, the railroad invoices the shipper for a period of time the vehicle remains in possession of the shipper when the vehicle is railroad owned. When the vehicle is shipper owned, the railroad invoices the shipper for a period of time that the vehicle held by the railroad while awaiting instructions by the shipper to place the vehicle with the shipper. The railroad invoices the shipper in accordance with tariff rules associated with the railroad. The tariff rules, or portions thereof, can be universally applicable to all railroad customers, or specifically applicable to the shipper.

According to the rail transport example, the control system (e.g., demurrage management system) collects event data or event information pertaining to the vehicle. The event data is indicative of events corresponding to the vehicle and can include timestamps and descriptions for each event. Some events trigger accrual of demurrage or storage costs for the vehicle, while other events suspend or terminate the accrual of costs associated with the vehicle. Examples of events can include entry and/or exit of a vehicle into or out of a designated location (e.g., a rail yard, shipping platform, parking lot, etc.), repair of the vehicle, the vehicle remaining stationary for a designated period of time, completion of a trip by the vehicle, the vehicle embarking on a trip, the vehicle being loaded with cargo, cargo being unloaded from the vehicle, delivery of the vehicle to a designated area, movement of the vehicle toward a designated area, etc. An amount of time elapsed between an event triggering accrual and an event terminating accrual identifies an amount of usage of the vehicle by the shipper. The amount of time elapsed can be expressed in terms of a variety of units such as hours, days, weeks, or a unit defined according to the tariff rules. For instance, the rules can define a vehicle day as the unit of time to which charges are assigned. A vehicle day can be a twenty-four period or portion thereof commencing at a predetermined time. Each occurrence of the predetermined time following an event can count as a vehicle day. Thus, a total number of those occurrences is a number of vehicle days since the event occurred. The counting of the occurrences of the predetermined time can be referred to as a clock, which is triggered, suspending, and/or terminating according to events.

Vehicle days can be chargeable or non-chargeable in accordance with the tariff rules or credits held by the shipper. A rate for a chargeable vehicle day can be provided by a billing schedule of the tariff rules, or a separate billing schedule. The billing schedule can standard for the railroad or negotiated between the railroad and the shipper and, thus, applicable only to interactions therebetween. The billing schedule can include a variable or tiered rate such that a charge correlated with each chargeable vehicle day varies.

As discussed above, a sequence of events determines a number of vehicle days in accordance with the tariff rules. Thus, collection and analysis of event data forms a genesis of a billed charge. Some events may not impact vehicle days, but can be useful in reports to facilitate advanced planning. For instance, one event included in the event data is an event indicating a vehicle inbound to the shipper is being transported by the railroad. This event transitions the vehicle to an en route state, but does not affect vehicle days. Another example is an arrival event, which occurs when the vehicle arrives at a location (e.g., a rail yard) serving the shipper. This event transitions the vehicle to an active state, but does not trigger accrual of vehicle days. Therefore, the state of the vehicle may or may not be correlated or associated with whether vehicle days are accruing.

A placement event, however, can trigger the clock and, thus, begin the accrual of vehicle days. The placement event can be an actual placement or a constructive placement. Actual placement refers to physically placing the vehicle at a location accessible to the shipper or a location specified by the shipper. When the vehicle is railroad-owned, actual placement activates the counting of vehicle days. Constructive placement can be governed by the tariff rules and refers to a tender of the asset by the railroad when the vehicle cannot be actually placed. Constructive placement can occur with notification such that the railroad communicates to the shipper that the vehicle is available and effectively tendered as of a date of the communication. Constructive placement can occur without notification. For instance, the railroad can place the vehicle on a shipper-controlled track at a location inaccessible to the shipper. Constructive placement can trigger accrual of vehicle days. For shipper-owned assets, actual placement following constructive placement stop the accrual of vehicle days.

Other events can occur when the shipper issues instructions or orders to the railroad with respect to the vehicle. In some instances, these events can suspend or terminate the clock. For example, following constructive placement of the vehicle, an order for placement suspends the clock when the vehicle is railroad-owned. The clock resumes upon actual placement of the vehicle. For shipper-owned vehicles, the order for placement terminates the clock.

Another example of an event is associated with a request, from the shipper to the railroad, for a vehicle for outbound loading of goods or cargo. Under some tariff rules, this event does not directly impact vehicle days, but generates circumstances which can render an effect. For instance, the request can include a date specified by the shipper. When specified, the clock is not triggered until that date even when the vehicle is placed, actually or constructively, beforehand. When a date is not specified in the request, actual or constructive placement of the requested vehicle starts the clock.

Another type of instruction from the shipper to the railroad is a release, which is a notification that the vehicle is available to be pulled. The vehicle can be received as a loaded vehicle (e.g., a vehicle carrying cargo) but that is later released as an empty vehicle (e.g., a vehicle that is not carrying cargo or that is not carrying the same cargo as before). The vehicle can be received as a loaded vehicle and also released at a later time as a loaded vehicle. As another example, the vehicle can be received as an empty vehicle that is later released as a loaded vehicle. Or, the vehicle can be received as an empty vehicle that is later released as an empty vehicle. A loaded vehicle that is later released as a loaded vehicle can occur when the vehicle is unloaded after receipt and then reloaded before release, when the shipment being carried by the vehicle is refused, and/or when the vehicle is to be reshipped to another destination (while carrying the same or additional cargo). An empty vehicle that is released as an empty vehicle can occur when an ordered vehicle is no longer desired after receipt, or when the vehicle is unsuitable (e.g., dirty, wrong type, mechanical fault, etc.). The release can terminate the clock and ends the vehicle day or other accruing, chargeable time.

A pull event indicates when the railroad switches the vehicle from shipper-controlled track to railroad-controlled track. For shipper-owned vehicles pulled from shipper-controlled track without forwarding instructions, the clock can commence counting vehicle days until forwarding instructions are communicated from the shipper to the railroad.

Another example of an event is a relief claim. The shipper can request relief or exclusions from charges for vehicles under allowances specified in the tariff rules, for example. When a vehicle that is accessible or usable only in a particular orientation is placed incorrectly, relief can be available. Other grounds for relief include when the vehicle has a mechanical fault preventing usage of the vehicle, or when the vehicle is incorrectly placed (e.g., wrong location) by the railroad. Depending on the tariff rules applied, the relief claim can suspend the clock until the concern is remedied by the railroad. Alternatively, the relief claim can terminate the clock and expunge accrued vehicle days.

The above description of events and demurrage effects provide an example framework describing a manner in which tracked events and collected event data can lead to a determination of demurrage or storage charges according to one possible set of rules. Other tariff rules associated with different railroads, vehicle owners, shippers, vehicles, or the like, can involve modifications or exceptions to relevant events and effects above. In turn, different rules create different mechanics governing starting, stopping, and suspending the clock. Further, different rules generate varying invoiced amounts.

Based on collected event data, a timeline of a vehicle can be generated from which an amount of chargeable vehicle days can be determined. The control system (e.g., demurrage management system) calculates an expected charge for the amount of chargeable days, which can be compared to an invoiced amount provided by the railroad. When discrepancies arise, due to failure to account for exceptions for example, the control system can generate reports or other support documentation based at least in part on the collected event data. The reports or other documentation serves as evidence of the discrepancies to support a request for adjustment of the invoiced amount.

With reference to the drawings, the above noted features and embodiments are described in greater detail along with additional aspects and embodiments. Like reference numerals are used to refer to like elements throughout.

FIG. 1 illustrates a schematic block diagram of one embodiment of a control system 100, e.g., a demurrage management system. The system 100 determines usage charges, such as for demurrage or storage, for one or more vehicles and/or reconciles discrepancies between determined usage charges and billed charges on invoices. The system 100 operates on behalf of one or more entities 110 associated with the vehicles. The entities 110 can respectively occupy roles based on respective relationships to the vehicles. For instance, the entities 110 can operate as an owner 112 of a vehicle, a carrier 114 of the vehicle, and/or a user 116 of the vehicle. As described above, more than one role can be occupied by a single entity. For instance, the vehicle can carrier-owned such that a single entity is both the owner 112 and the carrier 114. Alternatively, the vehicle can be user-owned such that a single entity is both the owner 112 and the user 116.

The system 100 receives or retrieves various pieces of information to determine vehicle usage and an expected charge for the determined vehicle usage. Vehicle information 102 indicates properties of the vehicle. For example, the vehicle information 102 can specify the owner 112 of the vehicle, a type of the vehicle, an identifier for the vehicle, hazardous status of the vehicle and/or cargo being carried by the vehicle, a usage history of vehicle, and/or the carrier 114 serving the vehicle. Event information 104 indicates events associated with the vehicle. As described above, the event information 104 can specify, for an event, a timestamp indicating when the event occurred and a description of the event. The event information 104 can be input by one or more of the entities 110. As described later, the event information 104 can also be input from a vehicle location or tracking system, such as a global positioning system (GPS) system onboard one or more vehicles. User information 106 includes data employable to identify the user 116. For instance, the user information 106 can specify an identity of user 116, a location of user 115, vehicle types usable by the user 116, carriers serving the user 116, capacity of the user 116, and/or special accommodations extended to the user 116. Carrier information 108 indicates characteristics of the carrier 114 serving the user 116 and responsible for transporting the vehicle.

The control system 100 (e.g., demurrage management system) can communicate with the entities 110 and, through those communications, exchange notifications 120, reports 122, instructions 124, invoices 126, and/or reconciliations 128. The notifications 120 can provide information regarding occurrences of events associated with the vehicles. The information can be autonomously provided to one or more of entities 110, or provided to a single entity for communication to other entities 110. For example, a notification of a release event can be provided to user 116 for communication to carrier 114. Notifications 120 can also be generated to convey relief claims, constructive placements, invoice discrepancies, vehicle orders, vehicle placement instructions, and/or forwarding instructions. Reports 122 provide detailed information according to a set of criteria. For instance, one report can provide an event history for the vehicle. Other reports include, but are not limited to, reports on accrued usage charges for the vehicle or cumulatively for all vehicles, listings of vehicles by state (e.g., active, inactive, en route, etc.), listings of possible exceptions for claiming, and/or reports regarding servicing of the user 116 by the carrier 114. Instructions 124 can be input to the system 100 and include, without limitation, vehicle releases, forwarding instructions, placement orders, vehicle orders, relief requests, and reconciliation requests. Invoices 126 can be input to the system 100 by carrier 114 or owner 112 for comparison to expected charges generated by the system 100. When discrepancies are identified, the system 100 can generate reconciliations 128 to correct the inconsistencies. Reconciliations 128, in an aspect, can include a request for adjustment as well as applicable notifications 120 or reports 122 supporting the request. In one embodiment, a reconciliation 128 may result in a change of a state or condition of a vehicle or cargo. For example, responsive to identifying a discrepancy that a user has been charged for a vehicle that has remained stationary due to a fault in the vehicle, another replacement vehicle may be moved to the location of the faulty vehicle (or another location) to replace the vehicle, repair of the vehicle may be ordered or initiated, or cargo that is onboard the vehicle or is scheduled to be loaded onto the vehicle may be loaded onto another vehicle.

The control system 100 (e.g., demurrage management system) and the entities 110 can communicate via the Internet, a local area network (LAN), a wide area network (WAN), or a combination thereof over one or more wired or wireless links. For example, the entities 110, via one or more computing devices, can connect wirelessly, via WiFi, cellular radio, or the like, to a first LAN or WAN. The first LAN or WAN, in turn, is connected via a cellular communication link or a wired link to the Internet. Also, connected to the Internet is a second LAN or WAN to which the system 100 can be connected wired or wirelessly. The above connection scheme is an example of one possible setup and other network topologies are employable with the aspects described herein and the claimed subject matter. For instance, system 100 can be implemented as a cloud-based or Internet-based system. Accordingly, the demurrage management service described herein can be a cloud service and, as such, a nebulous networking and/or computing structure, generally opaque to client computing devices, implements the system 100 and enables access to the system 100 by entities 110 via one or more exposure points (e.g., IP addresses, web addresses, network addresses, domain names, uniform resource indicators (URIs), application program interfaces (APIs), etc.). In this manner, the system 100 can execute on one or more physical computing devices (i.e., hardware) located remotely from entities 110 such as in a data center or other installation. In addition, the system 100 can also execute on one or more virtual machines, which in turn, execute on one or more physical computing devices. In this way, the system 100 can be modified (e.g., relocated to different physical hardware, scaled up (e.g., given greater resources), scaled down (e.g., given less resources), etc., without disruption to entities 110 or the operations of the entities 110.

Figure 2:
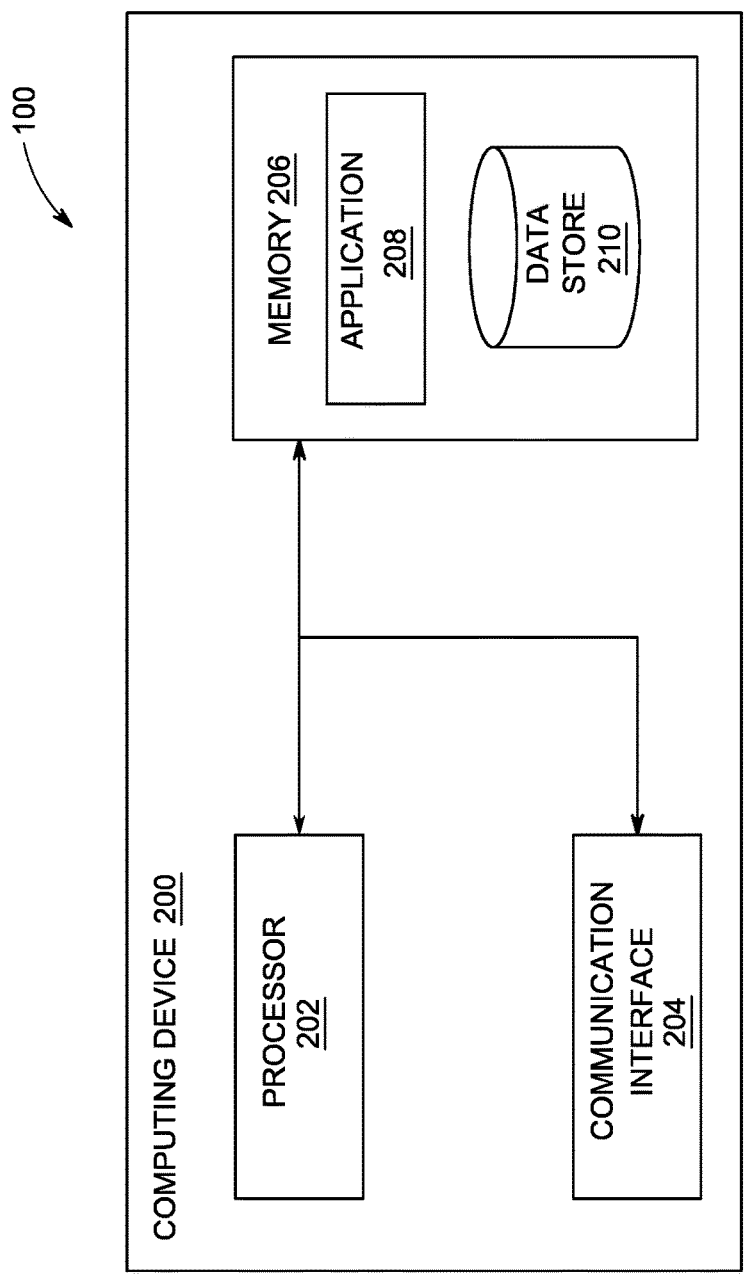
FIG. 2 illustrates another schematic block diagram of one embodiment of the system shown in FIG. 1.

FIG. 2 illustrates a block diagram of one embodiment of the control system 100 (e.g., demurrage management system). The system 100 may include one or more computing devices 200 having hardware circuitry that include and/or are electrically coupled with one or more processors 202 (e.g., microprocessors, field programmable gate arrays, integrated circuits, or other electronic logic-based devices). The processors 202 execute computer-executable instructions such as instructions forming application 208 to implement the system 100. In one embodiment, the functions and operations described herein (which are at least partially provided in flow diagrams or flowcharts, prose, or other manners to provide details of the processor structure) can represent one or more algorithms that transform a general purpose computer or processor into a special purpose computer or processor that is programmed to perform the disclosed algorithm or algorithms. The processors 202 can perform the functions or operations described herein as being performed by the system 100. Such computer-executable instructions can be stored on one or more computer-readable storage media including a non-transitory, computer-readable storage medium such as memory 206. The memory 206 can further include a data store 210 retaining various data described later. The application 208 can access the data retained by the data store 210.

The computing device 200 of the system 100 includes a communication interface 204. As schematically depicted and described herein, a "communication interface" refers to a logical interface through which communication between at least two entities is established and conducted. The communication interface 204 incorporates an address or identifier to which transmission can be directed for reception by the entity utilizing the interface 204. The address or identifier also serves to identify an origin for transmission from the interface 204. As a logical interface, the communication interface 204 can include one or more protocols enabling the communication. These protocols can be layered (e.g., according to the OSI model). Further, these protocols can vary depending a medium of transmission. For example, the communication interface 204 can utilize a wired or wireless medium. To this end, as utilized herein, the communication interface 204 also includes physical interfaces and transmit/receive processing chains to implement the communication via the medium. For example, the communication interface 204 can include physical wired or wireless interfaces such as, but not limited to, a USB interface, a serial interface, a WiFi interface, a short-range RF interface (Bluetooth), an infrared interface, a near-field communication (NFC) interface, an Ethernet interface, a fiber optic interface, a cellular radio interface, a satellite interface, etc.

The computing device 200 can be a single server or a group of servers operating jointly to support the application 208. As utilized herein, a "server" refers to a type of computing device having one or more computer processors coupled to a memory (e.g., a non-transitory, computer-readable storage medium) storing computer-executable instructions for providing a service or remote functionality to one or more client devices such devices associated with entities 110. The server can be a virtual machine including virtualized hardware elements executing on one or more physical computing devices. According to another embodiment, the server can be a package of computer-executable instructions and computer-readable data, which is executed on a virtual platform. The virtual platform can include a bundle of computing resources provided by one or more physical computing devices and can provide an execution environment for the application 208. In other words, the server can be provided as a cloud-based service and, further, can be provided on top of additional cloud computing services (e.g., platform-as-a-service, infrastructure-as-a-service, etc.).

Figure 3:
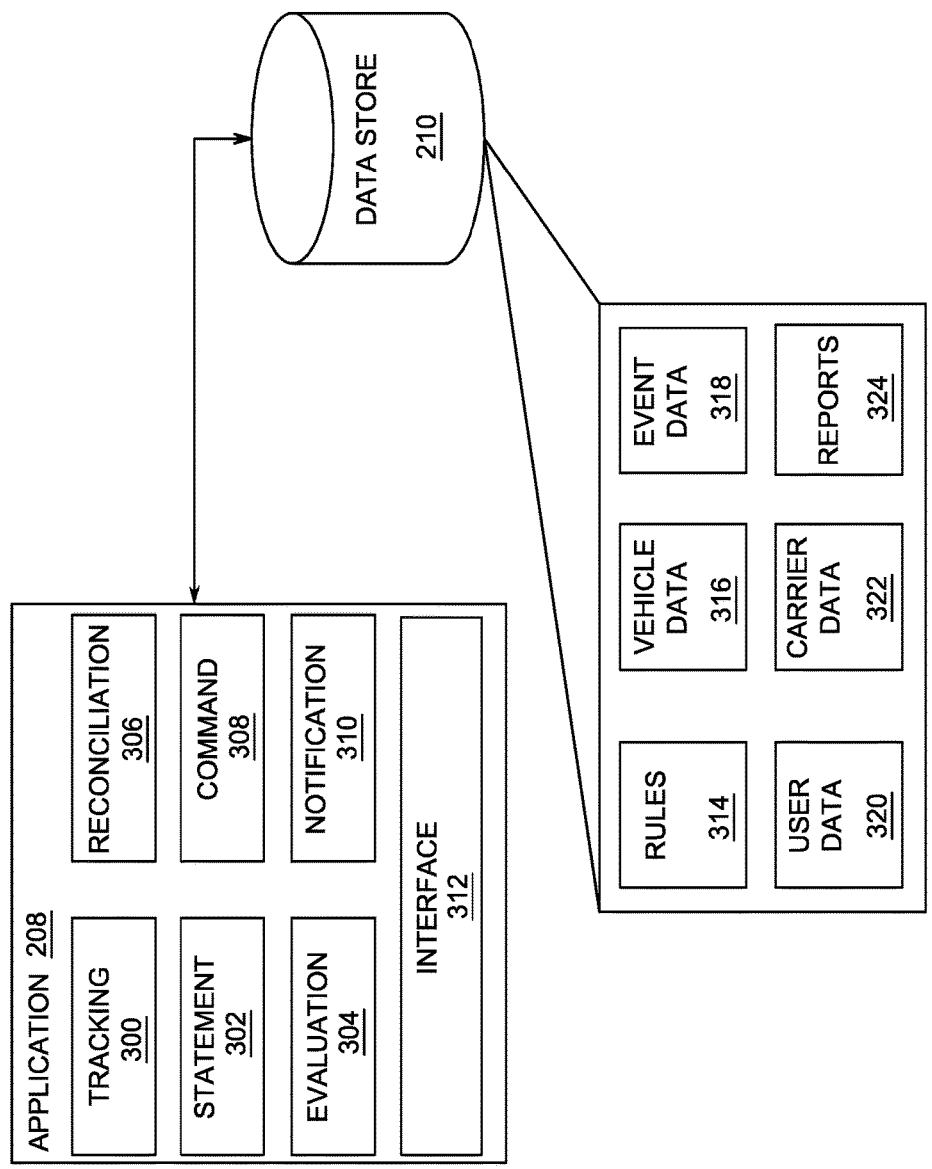
FIG. 3 illustrates a schematic block diagram of one embodiment of an application executed by the computing device to implement the system shown in FIG. 1.

FIG. 3 illustrates a block diagram of one embodiment of operations of the processor 202 operating using the application 208 as executed by the computing device 200 to implement the control system 100 (e.g., demurrage management system). The processor 202 performs various operations based on the application 208, such as tracking events 300, generating statements 302, evaluation of invoices 304, reconciliation of statements and/or invoices 306, generation of commands 308, generation of notifications 310, and providing a user interface 312. The processor 202 is coupled (e.g., communicatively coupled and/or electrically coupled) to the data store 210, which stores retaining a set of rules 314, asset data 316, event data 318, user data 320, carrier data 322, and reports 324.

In operation, the control system 100 (e.g., demurrage management system) monitors events (e.g., tracking 300) associated with one or more vehicles. While the description herein focuses on a single vehicle, the description also may apply to multiple vehicles. The system 100 tracks the events by receiving event information 104 and storing the event information 104 to the data store 210 as the event data 318. The event information 104 can be input manually by one or more of owner 112, carrier 114, or user 116 and received via the interface 312. For example, the system 100 can generate a user interface 312 that is accessible with a web browser application executing on computing devices associated with one or more of the owner 112, carrier 114, or the user 116. The event information 104 can be provided to application 208 through such a web-based user interface. Alternatively, to generate the interface 312, the system 100 can utilize one or more application program interfaces (APIs) associated with a vehicle location system to obtain the event information 104. In one embodiment, the interface 312 may include or represent transceiving circuitry that can communicate data via data signals sent over wired and/or wireless connections. For example, the interface 312 can include or represent an antenna and transceiving circuitry to wirelessly communicate data.

The control system 100 (e.g., demurrage management system) generate statements 302 by evaluating the event data 318 to determine an amount of usage of the vehicle in accordance with a set of rules 314, which may be stored in the memory 206. The processor 202 of the system 100 can use the data bus of the processor 202 to access the rules from the memory 206 or from an internal memory of the processor 202. The processor 202 optionally may be referred to as a charge management processor or vehicle management processor. While the description herein focuses on a single processor 202 performing the various operations, the processor 202 may represent multiple processors 202 performing different operations, multiple processors 202 sharing in the performance of some or all of the same operations, or a single processor 202 performing the operations.

The processor 202 may generate statements 302 by associating an expected charge with the amount of usage based on at least a subset of the set of rules 314. For example, the arithmetic/logic unit (ALU) of the processor 202 can compare the amount of usage of the vehicle as received by the processor 202 with the rules to determine the expected charge. Increased amounts of usage and/or different vehicles may be associated with increased charges relative to lesser amounts of usage and/or other types of vehicles. The ALU of the processor 202 can determine the charges based on the types of vehicles and the amounts of usage of the vehicles.

In one example, the subset of the rules can include a billing schedule that dictates a rate at which vehicle usage is charged. The processor 202 can generate a statement report (e.g., statement 302) indicating the amount of usage and the expected charge, which is stored in data store 210 as one or more reports 324. In determining the amount of usage of the asset, the processor 202 (e.g., the ALU of the processor 202) can identify one or more exceptions, events, or circumstances which, according to the rules 314, alter the amount of usage of a vehicle for the statement 302. The ALU of the processor 202 can alter the amount of usage by comparing the exceptions, events, or circumstances applicable to the vehicle and received by the processor 202 to the rules to determine if any of the exceptions, events, or circumstances match or otherwise correspond with a rule that reduces or increases the amount of usage. The processor 202 can generate an exceptions report as part or separate from the statement 302, which also may be stored in the data store 210 or in another location.

The processor 202 can evaluate 304 invoices by comparing an invoice corresponding to the vehicle with the amount of usage determined and the expected charge to identify any discrepancies. For example, the ALU of the processor 202 can obtain the invoice from the memory 206 via a data bus of the processor 202 and can compare the invoice (or the charges included in the invoice) with the expected charge determined by the ALU, as described above. If the charge in the invoice and the expected charge are different by at least a threshold amount (e.g., a threshold of zero, a threshold of 5% different, a threshold of 10%, a threshold of a current interest rate, etc.), then the ALU of the processor 202 may determine that a discrepancy exists. The discrepancy can relate to differences between chargeable time stated on the invoice and the amount of usage determined by the processor 202 in the statement 302, differences between the expected charge and a charge stated on the invoice, or both. The processor 202 can attempt to reconcile 306 the discrepancy by generating a request for correction based on the discrepancy identified. For example, in response to the ALU of the processor 202 determining that a discrepancy exists, the ALU may send data to the memory 206 and/or to the interface 204 that represents the discrepancy and/or a request to correct the discrepancy. The request may include the difference identified by the processor 202, the invoiced charge, and/or the expected charge.

To accompany the request, the processor 202 (e.g., the ALU) can generate a report evidencing the discrepancy. The report can be extracted from other reports 324, or generated based on the event data 318 stored in the memory 206 (and accessed by the ALU via a data bus of the processor 202). The report, in one example, can provide a timeline of events and an amount of usage time accrued from the timeline based on the set of rules 314. Thus, the report can provide evidence of a miscalculation of usage time. In another example, the report can indicate allowances or exceptions unaccounted for in the invoice, which lead to the discrepancy.

The processor 202 can generate one or more commands 308 in response to receipt of an instruction, from a user 116 for example, and execute the received instruction. The instruction, according to one example, can be a request for a vehicle (e.g., an order in the rail transport example described above). The processor 202 (e.g., the ALU), responsive to receipt of the request for the vehicle (e.g., via the data bus of the processor 202), can generate a signal or message, indicative of the request, as a command 308 to be conveyed to the carrier 114. In another example, the instruction can a release of the vehicle back to the carrier 114 or owner 112. Similar to the vehicle order instruction, the processor 202 can generate a signal or message indicating the release as a command (e.g., a command signal) 308. Additional examples of instructions can include an order to place a vehicle, a relief request, an adjustment request, or instructions providing data to be stored and/or edits to data already stored. For instruction corresponding to events (e.g., vehicle orders, vehicle releases, placement orders, etc.), the processor 202 can generate event information 104 to be appended to event data 318 as a command 308. The ALU of the processor 202 can combine the event information 104 with other event data and store this combined information in the memory 206 via the data bus of the processor 202. In one aspect, the instructions received can be captured via a user interface, which may be web-based, that is generated by the interface 312.

The processor 202 issues notifications 310 to one or more of entities 110. The notifications 310 can represent electronic signals including information on events monitored or tracked 300 by the processor 202 so that the entities 110 can remain apprised on statuses of vehicles. In other aspect, the notification can include information regarding the requests or instructions processed by the commands 308 issued by the processor 202. For instance, the processor 202 can notify 310 a user by communicating the command messages or signals 310 generated by the processor 202, such as by the ALU sending data to the interface 204 via the data bus of the processor 202.

The processor 202 can dispatch the notifications 310 with the communication interface 204 via a variety of communications media. For example, the notifications can be communicated via facsimile, electronic mail, text messages, an API based on HTTP or other remote procedure call protocol, or other electronic data exchange medium. In another aspect, the processor 202 can communicate notifications 310 via interface 312. For instance, notifications 310 can be displayed on the user interface of the computing device 200. The processor 202 can provide data communication via an application-level protocol to generate the interface 312. Accordingly, the interface 312 generated by the processor 202 can include one or more APIs consumed by clients (e.g., applications) executing on computing devices such as personal computers, mobile devices, or servers. Via the APIs, the processor 202 can push the notifications 310 to the clients.

The data store 210 may retain vehicle data 316, user data 320, and/or carrier data 322, which respectively correspond to vehicle information 102, user information 106, and/or carrier information 108 that is input to the system 100. While the data enables the processor 202 to operate relative to a plurality of vehicles 202 and interact with a plurality of users and carrier, the data also enables the processor 202 to selectively apply different rules depending on the vehicle, carrier, and/or user.

Figure 4:
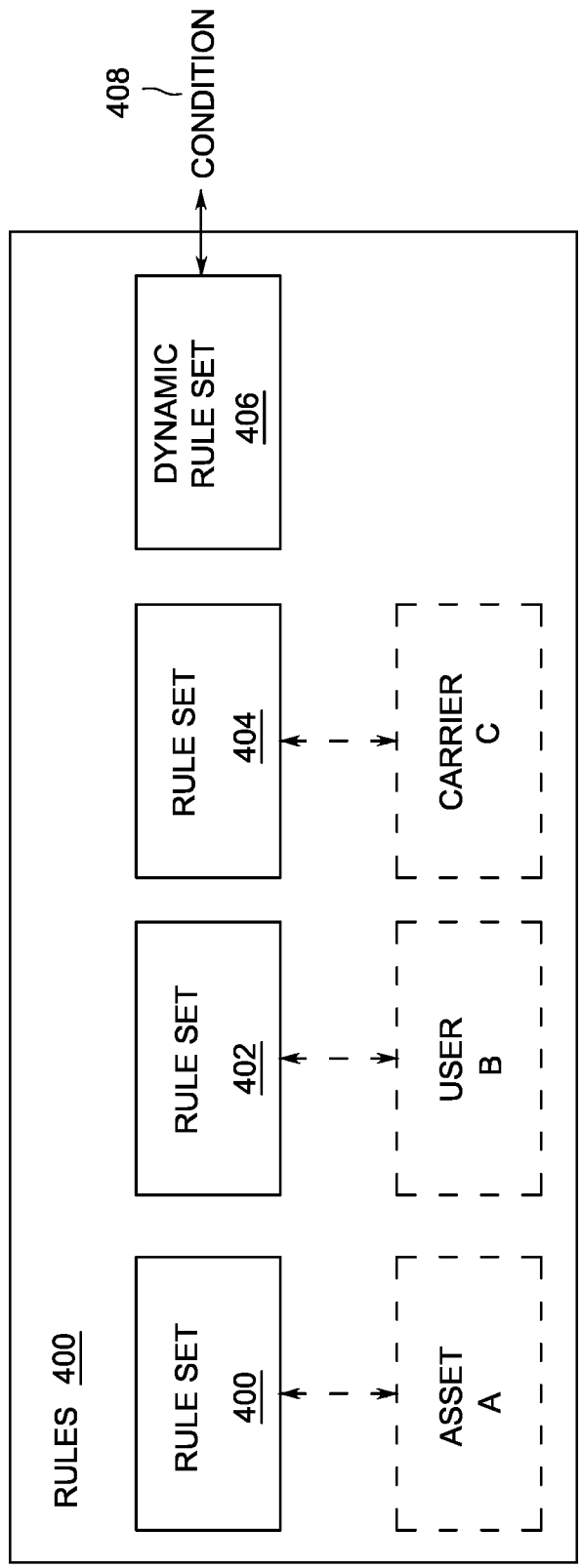
FIG. 4 illustrates a schematic block diagram of one embodiment of various rules utilized by the system shown in FIG. 1.

FIG. 4 illustrates a block diagram depicting one aspect of rules utilized within the control system 100 (e.g., demurrage management system). Rules 314 can include a plurality of sets of rules respectively applicable under varying circumstances. Rule set 400, for instance, can be utilized to determine usage charges associated with a particular vehicle A. Other rules can be associated with specific users, such as rule set 402 and user B, or specific carriers as with rule set 404 and carrier C. For example, for vehicles transported by Carrier C, the system 100 can utilize rule set 404 to determine usage charges. In another example, rule set 402 can be used for vehicles used by user B. In situations involving combinations of vehicle A, user B, and carrier C, a union of rule sets 400, 402, and 404 can be generated and employed. The union can be generated by the system 100 or curated by entities 110 to produce a resultant rule set including various portions of rule sets 400, 402, and 404, as desired.

For example, when only a single rule set applies for charged incurred for a vehicle, a user, or a carrier, then that single rule set may be used to determine the charges. But, if different sets of rules are associated (e.g., in the memory 206) with different vehicles, users, carriers, etc., and a combination of two or more vehicles, users, and/or carriers is needed to determine the charges, then the different sets of rules may be combined into a combined rule set. The usages and charges associated with the vehicle, user, and/or carrier may then be compared to the rules in the combined rule set to determine the incurred charges.

Rules 314 can also include a dynamic rule set 406 that includes variable rules responsive to a condition 408. For example, the condition 408 can be an availability of a type of vehicle. Accordingly, the dynamic rule set 406 can specify a variable rate dependent on the availability of the type of vehicle. When availability is low, the rate is increased. Likewise, during periods of high availability, the rate can be lowered. Availability can affect other rules beyond just rate. For instance, availability can have a threshold effect that activates certain provisions of the dynamic rule set 406 when availability of a type of vehicle increases or decreases past a predetermined level. One example of a provision that can be activated is an early return credit that extends a reward to users for rapid disposition of a vehicle of a type experiencing high-demand but low availability. Such dynamic provisions can encourage efficient utilization of vehicles.

For example, the different types of vehicles may include rail boxcars, covered rail wagons, refrigerator cars, flatbed rail cars, passenger cars, hopper cars, Schnabel rail cars, gondola cars, mine cars or carts, quarry tub cars, locomotives, or other types of vehicles. Two or more of these types of cars may be charged at different rates (e.g., in terms of the financial amount per unit time or the length of time at which the vehicles may be used for a fixed rate) according to different rules. The rules may change the rates at which different vehicles are charged based on the location of the vehicles, based on how many of the different types of vehicles are available, or other factors. Two or more different users may be charged different rates based on different rules, such as the amount of vehicles used by the different users in a preceding time period (e.g., the previous year), how many other vehicles are currently being used by the users, or other factors. Two or more different shippers or types of cargo also may be associated with different rules that result in different rates being charged to the shippers and/or cargo. Depending on the combination of vehicles, users, cargo, shippers, or the like, a dynamically changing rule set may apply for the combinations to determine how much or what rate to charge for the combination. For example, a first type of vehicle may be charged at a first rate, a second type of vehicle may be charged at a second rate, a first user may be charged a third rate, a second user may be charged a fourth rate, a first type of cargo may be charged at a fifth rate, and a second type of cargo may be charged a sixth rate. The rule set that determines how much to charge for the vehicle, cargo, user, shipper, etc., may dynamically change as one or more factors (e.g., the type of vehicle, shipper, cargo, etc.) change. For example, a combination of the first vehicle being used by the first user to ship a first cargo may be charged a combination (e.g., a sum, product, average, median, or other calculation) of the first rate, the third rate, and the fifth rate. But, if the first user changes the type of vehicle to the second vehicle type, the dynamically changing rule set may cause the first user to be charged a combination of the second rate, the third rate, and the fifth rate. If the first user continues using the second vehicle type to move or store the second type of cargo, then the dynamically changing rule set may cause the first user to be charged a combination of the second rate, the third rate, and the sixth rate. The rule set may continue to dynamically change based on changes in circumstances in other situations in addition to or as an alternate to changes in the user, the type of vehicle, and/or the type of cargo.

Figure 5:
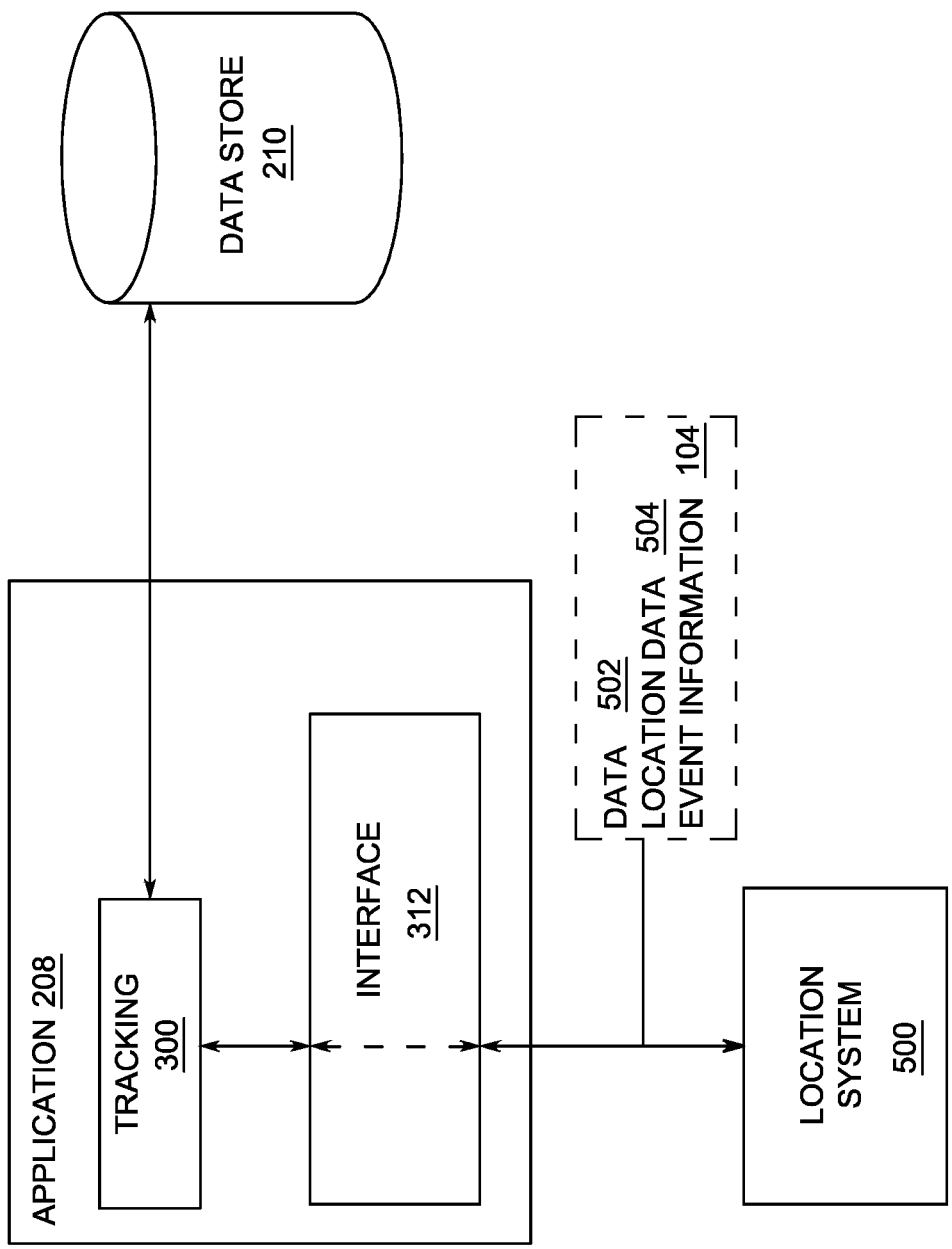
FIG. 5 illustrates a schematic block diagram of one embodiment of the system shown in FIG. 1 interacting with a vehicle location system.

FIG. 5 illustrates the processor 202 of the control system 100 (e.g., demurrage management system) maintaining the dynamic rule set 406 through integration with a vehicle location system 500 ("Location System" in FIG. 5) according to one embodiment. The processor 202 can track 300, via the interface 312 generated by the processor 202, and utilize one or more APIs, access points, or communication protocols associated with the vehicle location system 500 to receive vehicle-related information. For example, the processor 202 can query the vehicle location system 500 for information pertaining to a particular vehicle, for information regarding vehicles associated with a particular carrier or user, and/or information related to a type of vehicle. In another example, the processor 202 can subscribe to a feed or data stream provided by the vehicle location system 500 to receive relevant information. Information obtained from the vehicle location system 500 can include vehicle data 502 that provides information identifying vehicles and specifying properties of the vehicles, location data 504 providing a location of one or more vehicles, and event information 104 associated with the vehicles. In one example, the event information 104 can be provided in the form of Car Location Messages (CLMs) and also referred to as movement data.

The vehicle location system 500 represents hardware circuitry that includes and/or is electrically connected with one or more processors (e.g., microprocessors, field programmable gate arrays, integrated circuits, or other electronic logic-based devices) that obtain, receive, and/or communication the vehicle data 502, location data 504, and/or event information 104. The vehicle location system 500 can receive some or all of this information from users, shippers, and/or owners. With respect to the vehicle data 502, this information can be automatically provided by GPS receivers onboard the vehicles, roadside transponders that record the passage of vehicles, cameras (e.g., at toll booths or other locations), or the like.

Through integration with the vehicle location system 500, the control system 100 can monitor and record vehicle traffic and usage across several users and carriers. The integration further enables autonomous tracking of exceptions or instances of claimable relief, which can be recorded and automatically factored into estimated charges. Thus, the system 100 can efficiently determine demurrage and/or storage charges for vehicles and provide an accurate check to ensure accurate invoicing of vehicle-related costs.

Figure 6:
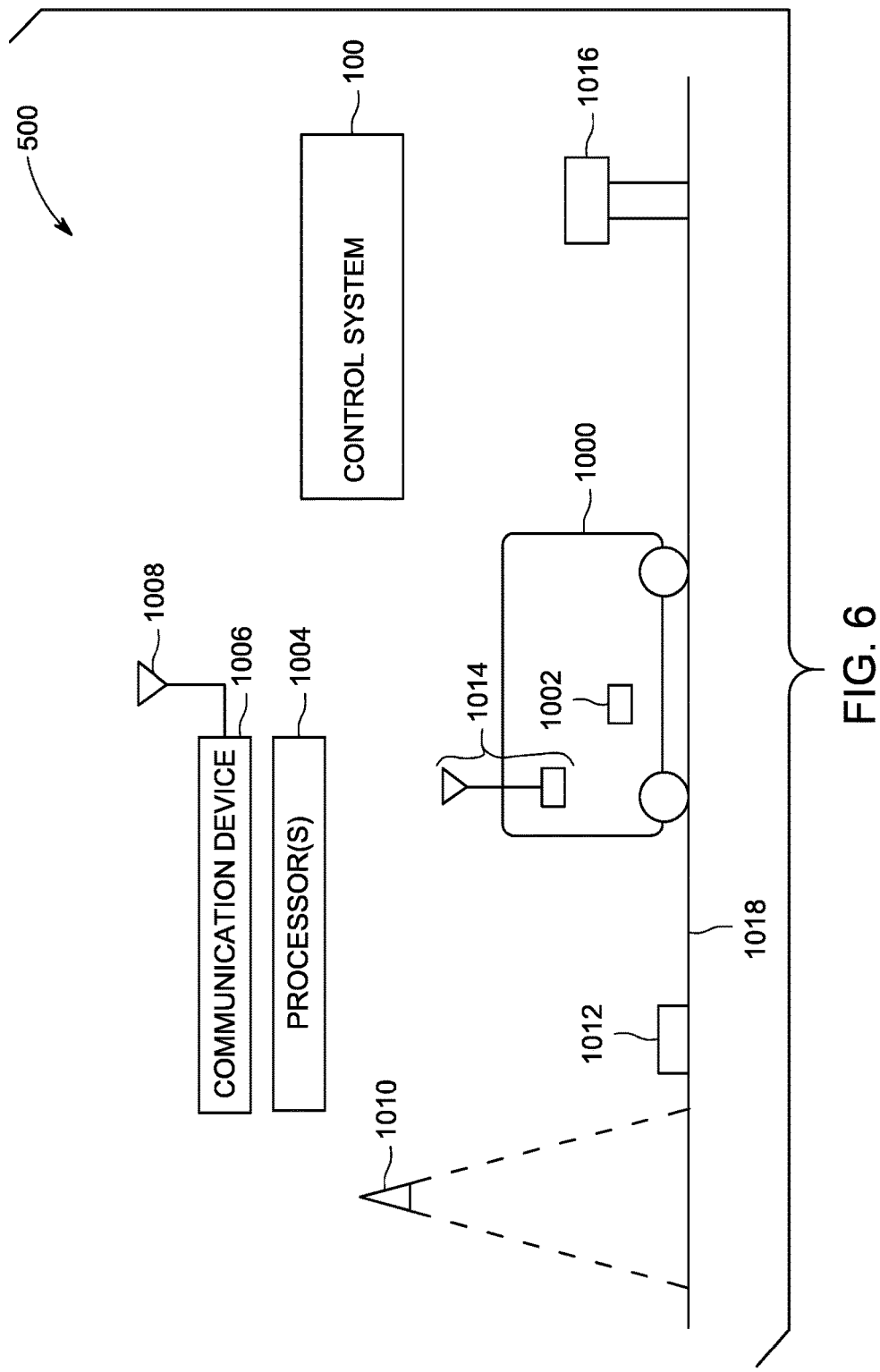
FIG. 6 illustrates one embodiment of the vehicle location system shown in FIG. 5.

FIG. 6 illustrates one embodiment of the vehicle location system 500 shown in FIG. 5. The vehicle location system 500 obtains and provides at least some of the vehicle-related information to the control system 100 (e.g., demurrage management system). For example, the vehicle location system 500 may determine the vehicle data 502, location data 504, and/or event information 104, and report this information to the system 100.

The vehicle location system 500 includes hardware circuitry that includes and/or is electrically connected with one or more processors 1004 (e.g., microprocessors, field programmable gate arrays, integrated circuits, or other electronic logic-based devices) that obtain, receive, and/or communication the vehicle data 502, location data 504, and/or event information 104. The vehicle location system 500 may include a communication device 1006, which can represent transceiving circuitry that communicates with one or more input devices 1010, 1012, 1014, 1016 of the vehicle location system 500 (e.g., electronic input devices) that provide some or all of the vehicle data 502, location data 504, and/or event information 104 to the vehicle location system 500. The communication device 1006 can include an antenna 1008 for wirelessly communicating this information to the system 100 via one or more wireless connections, or may be electrically coupled with the system 100 for communication this information via one or more wired connections. The input device 1010 can include a sensor (e.g., a camera, photodetector, radar, sonar, etc.), the input device 1012 can include an electromagnetic sensor, the input device 1014 can include a vehicle location device (e.g., a GPS receiver), and the input device 1016 can represent a computer, kiosk, or other device.

In one embodiment, at least some of the event data 318, the vehicle data 502, location data 504, and/or event information 104 may be automatically captured and/or reported to the control system 100 by the vehicle location system 500. For example, the entry of a vehicle 1000 into a designated area or geo-fence (e.g., a rail yard, parking lot, or other location) along a route 1018 may be automatically determined by one or more of the input devices 1010, 1012, 1014, 1016. The input device 1010 (e.g., sensor) may automatically detect passage of the vehicle 1000 to determine that the vehicle 1000 has entered into or left the designated area. The electromagnetic sensor 1012 can include a radio frequency identification (RFID) interrogator or tag that communicates with a complementary RFID tag or interrogator 1002 on the vehicle 1000 to detect passage of the vehicle 1000 to determine that the vehicle 1000 has entered into or left the designated area. The input device 1014 can determine the location of the vehicle 1000 and communicate the location to the processors 1004, which can compare the vehicle location to geo-fences or other designated areas to determine when the vehicle 1000 enters or leaves the designated area or geo-fence. The input device 1016 can receive operator-provided input, such as information about where the vehicle 1000 is located, when the vehicle 1000 enters or leaves the designated area, operations performed on the vehicle 1000, or other information. The input device 1016 can then communicate this information to the processors 1004 via one or more wired and/or wireless connections.

Optionally, one or more of the input devices 1010, 1012, 1014, 1016 can obtain data used to determine the identity and/or type of vehicle 1000. For example, a camera can obtain images or video of the vehicle 1000, which is examined by the processors 1004 to determine the vehicle type and/or identity (e.g., by comparing the image or video to stock images or shapes associated with different vehicle types and/or identities). The electromagnetic sensor 1012 can communicate with the complementary tag or interrogator 1002 to obtain the vehicle type and/or identity. The vehicle type and/or identity can be communicated from the vehicle 1000 to the processor 1004, and/or an operator may input the vehicle type and/or identity into the input device 1016.

The information provided by one or more of the input devices 1010, 1012, 1014, 1016 can be automatically communicated to the processors 1004, such as when passage of a vehicle 1000 is determined, when an identity of the vehicle 1000 is determined, etc. The processors 1004 may then automatically communicate the information to the control system 100, which can be used to determine chargeable usage of the vehicle 1000, as described herein.

In view of the example devices and systems described above, methodologies that can be implemented in accordance with the disclosed inventive subject matter are described with reference to the flow charts of FIGS. 7 and 8. The methodologies are shown and described as a series of blocks; however, the claimed subject matter is not limited by the order of the blocks, as some blocks can occur in different orders and/or concurrently with other blocks. Moreover, not all illustrated blocks may be required to implement the methods described hereinafter. The methodologies can be implemented by the system described above with respect to FIGS. 1 through 5, for example. In one embodiment, the flowcharts illustrative of the methods and described in connection with FIGS. 7 and/or 8 may represent one or more algorithms used to program a computer or processor to perform the operations described herein.

The control system 100 (e.g., demurrage management system) can allow shippers to internally manage the demurrage, storage, and detention records relative to calculations used for unit trains, which are often miscalculated or invoiced by the owners of the unit trains. The system 100 can capture events of the vehicles in the unit trains (e.g., event data 318), dynamically determining rules for calculating the usage charges of the vehicles in the unit trains, and adjusting these charges within a short period of time.

Figure 7:
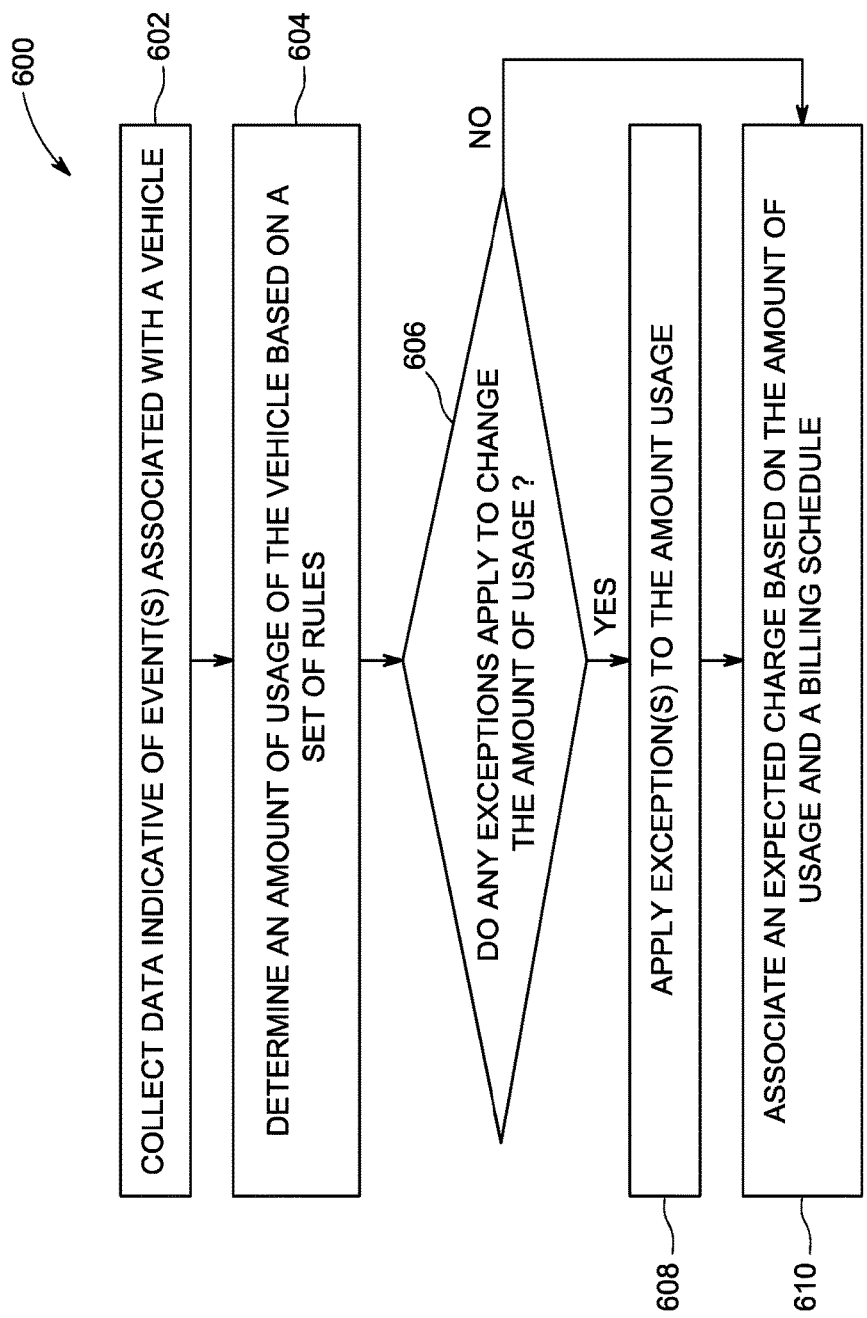
FIG. 7 illustrates a flow diagram of one embodiment of a method for determining an expected charge amount for usage of a vehicle.
Figure 8:
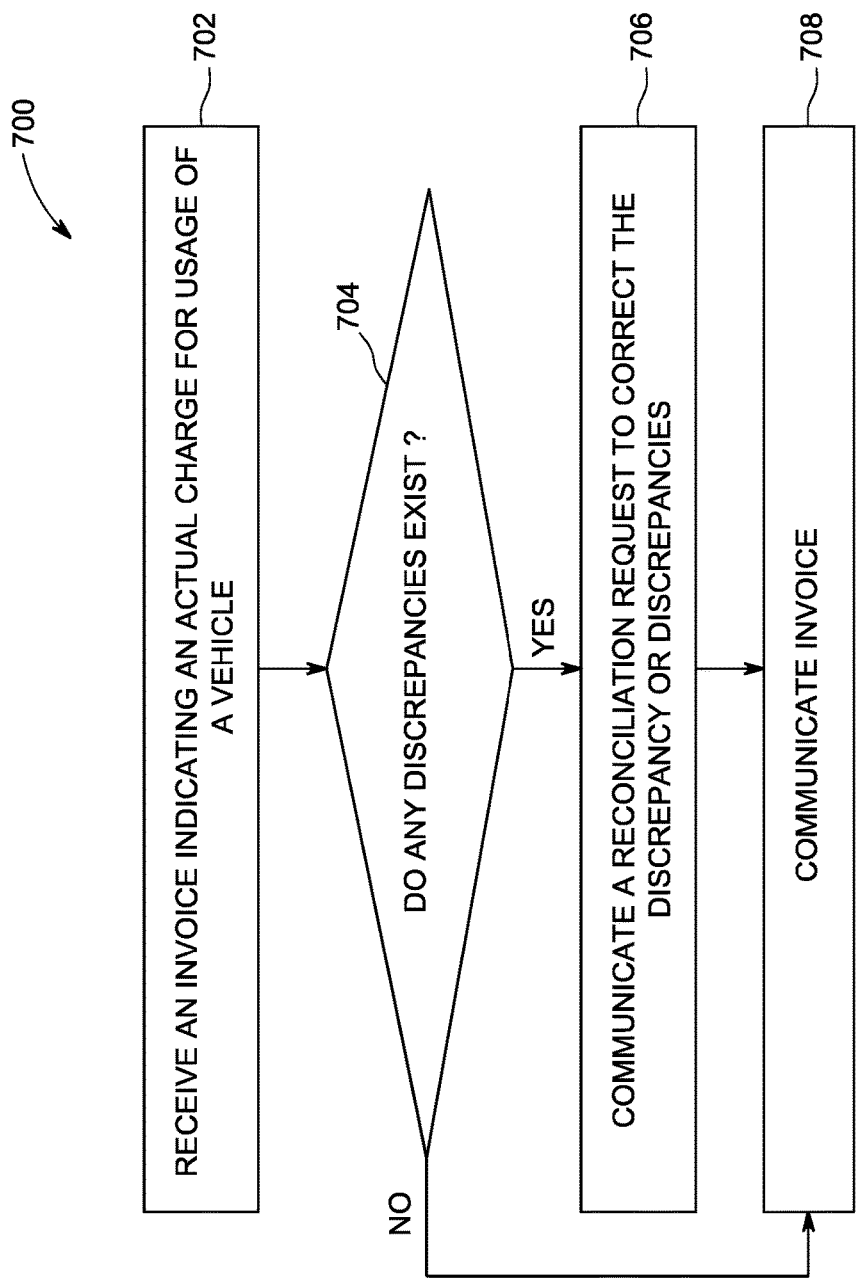
FIG. 8 illustrates a flow diagram of one embodiment of a method for reconciling discrepancies between an expected charge amount and an actual charge.

FIG. 7 illustrates a flow diagram of one embodiment of a method 600 for determining an expected charge amount for usage of a vehicle. The method of FIG. 7 can be performed, for example, by the control system (e.g., demurrage management system) described above. At 602, data indicative of events associated with a vehicle are collected. The data can be received as input manually provided by users or carriers. In some instance, input from user or carriers (such as but not limited to placement notifications, vehicle orders, placement orders, releases, and forwarding instructions) can be the data that are collected, or such input, when received by the system 100, generates the data collected, as event information. Alternatively, the data can be collected through integration with the vehicle location system 500. For instance, the data can be received in the form of Car Location Messages (CLMs) or other movement data corresponding to the vehicle. While vehicle events form one basis for usage charges (e.g., demurrage or storage charges), the data collected can extend beyond event notifications and include other information applicable in estimating charges. The data collected can include information indicating one or more of a vehicle identity, vehicle owner, type of vehicle, availability of a type of vehicle, demand of a type of vehicle, vehicle location, vehicle status, movement of the vehicle, vehicle condition, vehicle properties, vehicle orders or request, vehicle order-by-dates, weather reports, vehicle origin, vehicle destination, and/or substantially any other data, information, or characteristics pertaining to the vehicle.

At 604, an amount of usage of the vehicle is determined based on the data collected and one or more sets of rules. The set(s) of rules can be tariff rules, for example, corresponding to carrier responsible for transporting the vehicle. The set of rules can also include custom or special provisions activated for a particular user of the vehicle, for a particular type of vehicle, or based on other conditions such as vehicle availability, weather, or the like. The set of rules generally establish which events (indicated in the data collected) accrue usage charges, which events suspend accrual, and which events terminate the transportation cycle (e.g., conclude usage and terminate accrual of charges) and/or the charge for usage of the vehicle. In one aspect, one or more of the sets of rules that is used to determine the amount of usage of the vehicle and/or the accrual of charges for the vehicle is a dynamically changing rule set that changes over time and as factors change (e.g., the type of vehicle changes, the type of cargo changes, the demand for the vehicle or vehicle type changes, etc.).

At 606, a determination is made as to whether one or exceptions apply to change the amount of total chargeable usage. The set of rules may provide exceptions, exclusions, grounds for relief, and other provisions that effect an amount of total usage that is chargeable. For example, as indicated in the data collected, a total of five days can lapse between when the vehicle is initially tendered to the user and when the user release the vehicle back to the carrier. The data collected can indicate certain exceptions, however, such as for example incorrect placement of the vehicle or the vehicle being damaged that reduces the amount of chargeable time to three days, for example. The reduction in chargeable usage, in one example, accounts for the time required for the carrier to correct the error by, for example, moving the vehicle to a correct location or replacing the damage vehicle with a functioning vehicle.

If one or more exceptions apply to change the amount of total chargeable usage for a vehicle, then flow of the method 600 may proceed toward 608. Otherwise, if no exceptions apply, then flow of the method 600 may proceed toward 610. At 608, the one or more exceptions are applied to the total chargeable usage. For example, the total chargeable usage of five days in the preceding example can be reduced to three days (or another time period). In another example, one or more of the exceptions can increase the total chargeable usage. For example, if there is high demand and/or low availability for a type of vehicle, then the total chargeable usage for that vehicle type may be increased (e.g., relative to an equivalent usage of another type of vehicle). Flow of the method 600 may then proceed toward 610.

At 610, an expected charge is associated with the amount of usage determined. In one embodiment, the expected charge can be determined based on a billing schedule. The billing schedule, in one example, can be included in the set of rules employed at 604 to determine the amount of usage. In another example, the billing schedule can be provisions that are separate from the rules at 604. For instance, the billing schedule can be associated with a different rule set or may dynamically change, as described above. By way of example, in FIG. 4, a plurality of rules sets can be respectively associated with one or more of vehicles, carriers, and/or users. Moreover, as described above, respective portions of two or more rule sets can be combined to produce an aggregate or combined set of rules utilized by the control system 100 for a particular carrier-user combination, or a carrier-user-vehicle combination. Accordingly, the set of rules utilized at 604 to determine the amount of usage can be associated with the carrier, whereas the billing schedule used to assign a charge is associated with the user. Thus, as usage involves interactions between the user and the carrier (who in turn can be serving a plurality of users), carrier-specific rules can be applied. When determining a charge for the usage, however, user-specific rules can be applied. Accordingly, the billing schedule used at 606 can be a negotiated instrument between the carrier and the user.

The amount of usage of the vehicle and the expected charge can be employed to verify accuracy of an invoice. FIG. 8 illustrates a flow diagram of one embodiment of a method 700 for reconciling discrepancies on an invoice for usage of the vehicle. The method 700 can be performed by the control system 100 described herein. At 702, an invoice for usage of the vehicle is received. The invoice indicates an actual charge for the usage of the vehicle according to an entity issuing the invoice (e.g., the carrier). The invoice can be communicated by the issuer to the system 100, for example. Alternatively, the invoice can be input by a receiver of the invoice and/or the system 100 may generate the invoice. In an aspect, receiving information, electronically or through manual entry, indicative of the actual charge and the charged usage amount may constitute receiving the invoice.

At 704, the actual charge and the charged usage amount are respectively compared to the amount of usage and the expected charge determined based on event data and one or more sets of rules in order to determine whether any discrepancies exist. As described above, in one embodiment, a discrepancy may exist where the invoiced amount for usage of the vehicle differs from the chargeable time determined by the control system 100. If a discrepancy is identified or discovered, then flow of the method 700 may proceed toward 706 to resolve the discrepancy or discrepancies. If no discrepancy or relatively small discrepancies (e.g., discrepancies in the favor of the user or discrepancies that are smaller than a designated threshold) are discovered, then flow of the method 700 may proceed toward 708.

At 706, a reconciliation request is communicated to correct the discrepancies. For instance, when a discrepancy is identifier, a report is generated that indicates a timeline of events for the asset and an amount of chargeable usage, with exceptions applied, based on the set of the rules. The report provides evidentiary support for the reconciliation request.

At 708, the invoice (without the discrepancies or with small discrepancies) or the corrected invoice (e.g., after removal or correction of the discrepancies) is communicated to the interested parties. For example, the invoice or corrected invoice may be communicated to the owner of the vehicle, the shipper, and/or the user so that the invoice or corrected invoice may be paid.

Various embodiments of a control system (e.g., demurrage management system) described herein can be implemented in connection with a variety of computing devices, client devices, or server devices, which can be deployed as part of a computer network or in a distributed computing environment, such as the cloud or via cloud computing. The various embodiments described herein can be implemented in a variety of computer systems or computing environment having any number of memory or storage units, any number of processing units, and any number of applications and processes occurring across any number of storage units and processing units. This includes, but is not limited to, cloud environments with physical computing devices (e.g., servers) aggregating computing resources (e.g., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices. The client computing devices can access the computing services or functionality via application program interfaces (APIs), web browsers, or other standalone or networked applications. Accordingly, aspects of the membership-based service can be implemented based on such a cloud environment.

For example, the control system 100 (e.g., demurrage management system) can reside in the cloud environment such that the computer-executable instruction implementing the functionality thereof are executed with the aggregated computing resources provided by the plurality of physical computing devices. The cloud environment provides one or more methods of access to the system 100, which can be used by the entities 110 via computing devices, mobile devices, etc. These methods of access include IP addresses, domain names, URIs, etc. Since the aggregated computing resources can be provided by physical computing device remotely located from one another, the cloud environment can include additional devices such as routers, load balancers, switches, etc., that appropriately coordinate network data.

Figure 9:
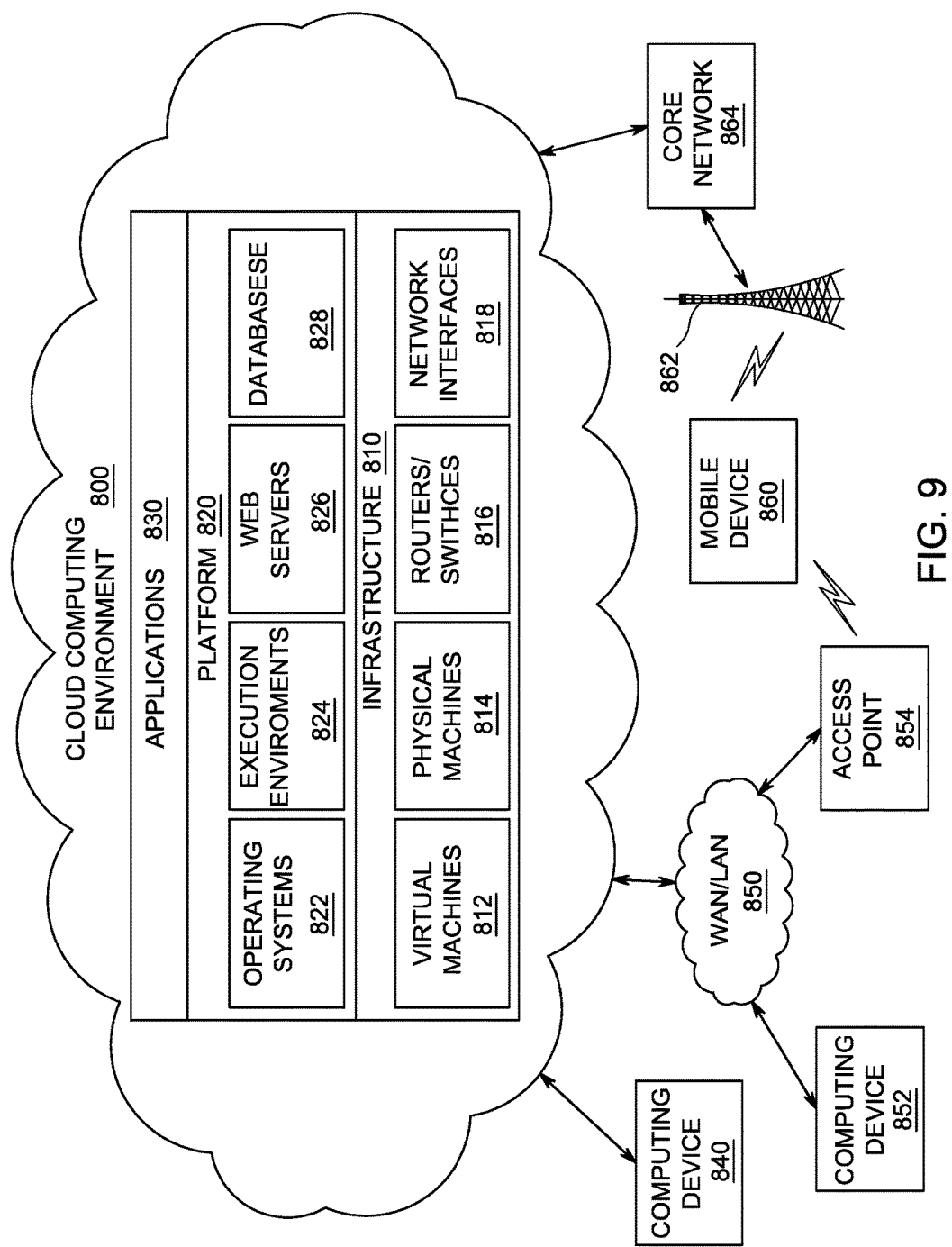
FIG. 9 illustrates a block diagram representing one example of a network environment in which various embodiments of the control system and/or vehicle location system described herein can be implemented.

FIG. 9 schematically illustrates one example of a networked or distributed computing environment, such as a cloud computing environment 800. The cloud computing environment 800 represents a collection of computing resources available, typically via the Internet, to one or more client devices. The cloud computing environment 800 comprises several levels, including infrastructure 810, a platform 820, and applications 830. Each level, from infrastructure 810 to applications 830 can be implemented on top of lower levels, with infrastructure 810 representing the lowest level.

Infrastructure 810 encompasses the physical resources and components on which cloud services are deployed. For instance, infrastructure 810 can include virtual machines 812, physical machines 814, routers/switches 816, and network interfaces 818. The network interfaces 818 provide access to the cloud computing environment 800, via the Internet or other network, from client devices such as computing devices 840, 852, 860, etc. That is, network interfaces 818 provide an outermost boundary of cloud computing environment 800 and couple the cloud computing environment 800 to other networks, the Internet, and client computing devices. Routers/switches 816 couple the network interfaces 818 to physical machines 814, which are computing devices comprising computer processors, memory, mass storage devices, etc. Hardware of physical machines 814 can be virtualized to provide virtual machines 812. In an aspect, virtual machines 812 can be executed on one or more physical machines 814. That is, one physical machine 814 can include a plurality of virtual machines 812.

Implemented on infrastructure 810, platform 820 includes software that forming a foundation for applications 830. The software forming platform 820 includes operating systems 822, programming or execution environments 824, web servers 826, and databases 828. The software of platform 820 can be installed on virtual machines 812 and/or physical machines 814.

Applications 830 include user-facing software applications, implemented on platform 820, that provide services to various client devices. In this regard, the control system (e.g., demurrage management system) described herein is an example application 830. As illustrated in FIG. 9, client devices can include computing devices 840, 852 and mobile device 860. Computing devices 840, 852 can be directly coupled to the Internet, and therefore the cloud computing environment 800, or indirectly coupled to the Internet via a WAN/LAN 850. The WAN/LAN 850 can include an access point 854 that enables wireless communications (e.g., WiFi) with mobile device 860. In this regard, via access point 854 and WAN/LAN 850, mobile device 860 can communicate wirelessly with the cloud computing environment 800. Mobile device 860 can also wirelessly communicate according to cellular technology such as, but not limited to, GSM, LTE, WiMAX, HSPA, etc. Accordingly, mobile device 860 can wireless communicate with a base station 862, which is coupled to a core network 864 of a wireless communication provider. The core network 864 includes a gateway to the Internet and, via the Internet, provides a communication path to the cloud computing environment 800.

As mentioned, advantageously, the techniques described herein can be applied to a variety of devices where it is desirable to track vehicle movement and status in order to verify proper usage charges. It can be understood, therefore, that handheld, portable and other computing devices and computing objects of a variety of types are contemplated for use in connection with the various embodiments of a demurrage management system or other control system. Accordingly, the below general purpose computer described below in FIG. 10 is but one example of a computing device.

Embodiments of the subject matter described herein can partly or entirely be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those of ordinary skill in the art will appreciate that computer systems have a variety of configurations and protocols that can be used to communicate data, and thus, no particular configuration or protocol is considered limiting.

Figure 10:
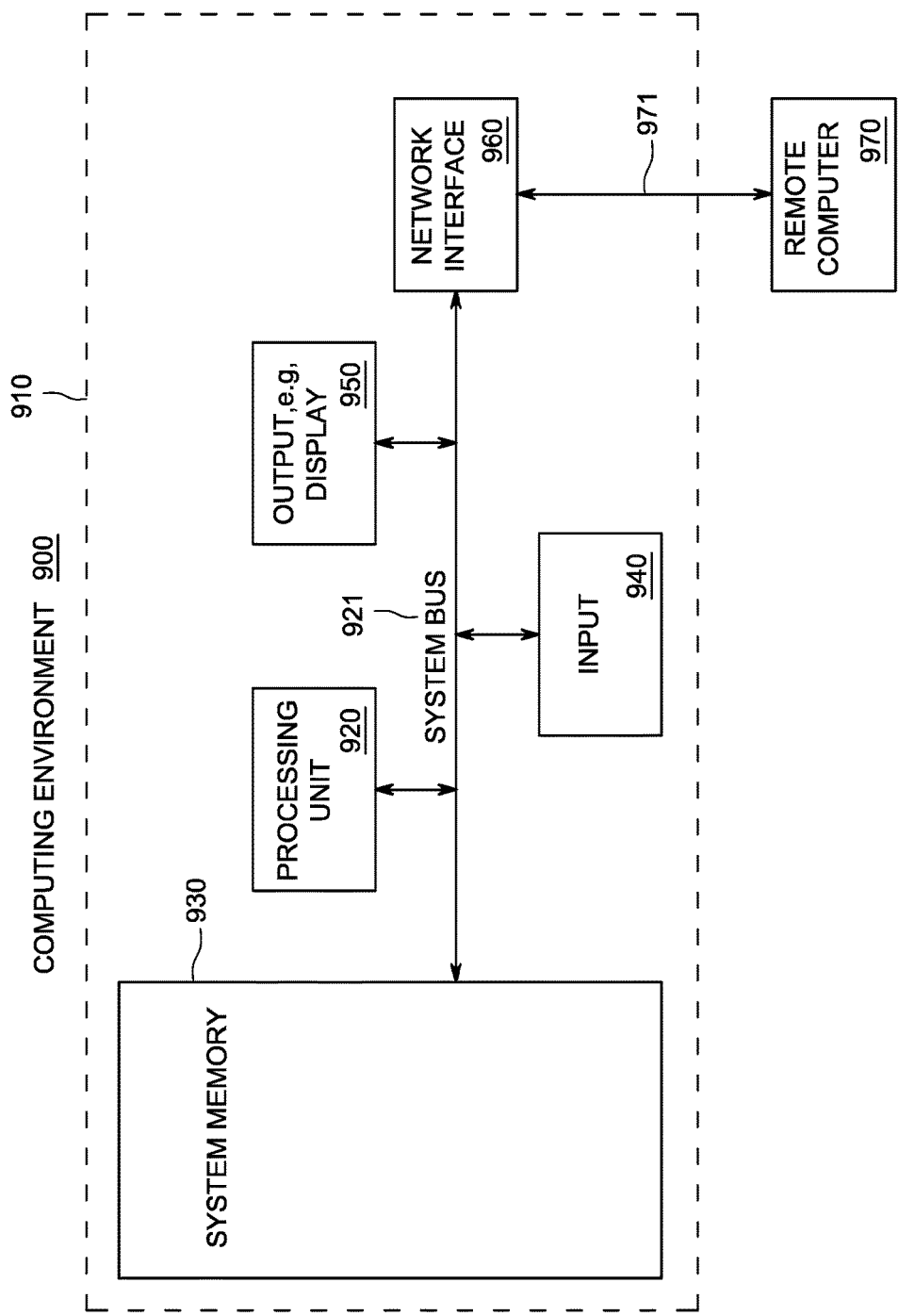
FIG. 10 illustrates a block diagram representing one embodiment of a computing system or operating environment in which one or more embodiments described herein can be implemented.

FIG. 10 illustrates one example of a computing system environment 900 in which one or more embodiments of the control system (e.g., demurrage management system) described herein can be implemented. The computing system environment 900 represents one example of a suitable computing environment and is not intended to suggest any limitation as to scope of use or functionality. In addition, the computing system environment 900 is not intended to be interpreted as having any dependency relating to any one or combination of components illustrated in the exemplary computing system environment 900.

One example device for implementing one or more embodiments includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data. According to a further example, computer 910 can also include a variety of other media (not shown), which can include, without limitation, RAM, ROM, EEPROM, flash memory or other memory technology, optical disk storage, or other tangible and/or non-transitory media which can be used to store desired information.

A user can enter commands and information into the computer 910 through input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 10 include a network 972, such local area network (LAN) or a wide area network (WAN), but may also include other networks/buses. Such networking environments are commonplace in homes, offices, enterprise-wide computer networks, intranets and the Internet.

As mentioned above, while some embodiments have been described in connection with various computing devices and network architectures, the underlying concepts may be applied to any network system and any computing device or system in which it is desirable to implement a demurrage management system or other control system as described herein.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

In one embodiment, a system (e.g., demurrage management system) is described. The system can include a tracking module configured to obtain event data associated with a vehicle. The system can further include a statement module configured to determine a charge for usage of the vehicle based at least in part on the event data and a set of tariff rules. In addition, the system can include an evaluation module configured to compare the charge for usage of the vehicle to an invoice corresponding to the vehicle to identify a discrepancy. Moreover, the system can include a reconciliation module configured to facilitate correction of the discrepancy identified between the charge for the vehicle and the invoice corresponding to the vehicle. According an example, the event data is indicative of events related to at least one of demurrage or storage of the vehicle.

According to another example of this embodiment, the tracking module obtains the event data from a vehicle location system. Alternatively, the tracking module obtains the event data as input from a user. In another example, the system can also include a notification module configured to communicate signals based to one or more entities associated with the vehicle. In some instance, the signals can be based on the event data. The notification module can be configured to communicate the signals to at least one of an owner of the vehicle, a lessee of the vehicle, or an entity responsible for servicing the vehicle on behalf the owner or lessee.

According to another example, the statement module is further configured to determine a chargeable period of time for usage of the vehicle based at least in part on the event data. The statement module is further configured to determine the charge corresponding to the chargeable period of time based on the set of tariff rules.

In another example, the system includes a command module configure to receive from an entity associated with the vehicle and execute the instruction. For instance, the entity associated with the vehicle is a carrier responsible for movement of the vehicle. Further, the tracking module can update the event data based on the instruction such that the statement module can determine the charge based at least in part on the instruction. The command module is further configured to generate support documentation to accompany the instruction. The support documentation based at least in part on the event data or the set of tariff rules.

The reconciliation module can be further configured to generate a request for adjustment of the invoice according to the discrepancy identified. In addition, the reconciliation module is further configured to generate evidence, based at least in part on the event data, indicative of the discrepancy to support the request for adjustment.

In additional examples, the set of tariff rules is one of a plurality of sets of tariff rules. Respective sets of tariff rules of the plurality of sets of tariff rules can be respectively associated with respective entities of a plurality of entities. For instance, the set of tariff rules can be associated with a carrier responsive for movement of the vehicle, an owner of the vehicle, or a consumer using the vehicle. In addition, the set of tariff rules includes one or more variable rules which dynamically change responsive to a condition. The condition, according to one aspect, is an availability of a type of the vehicle.

In another embodiment, a computer-readable storage medium is described. The computer-readable storage medium stores computer-executable instructions that, when executed by a processor, configure the processor to: receive event information indicative of events associated with a vehicle; generate an expected invoice amount for usage of the vehicle based on a set of rules and the event information; compare the expected invoice amount to an actual invoice amount specified on an invoice for the use of the vehicle to identify a discrepancy; and initiate a resolution process to rectify the discrepancy.

In an example, the computer-executable instructions further configure the processor to communicate with a vehicle location system to retrieve the event information. In addition, the computer-executable instructions can configure the processor to: determine a period of time for which usage of the vehicle is chargeable based at least in part on the event information; and associate a charge to the period of time determined, based on the set of rules, to generate the expected invoice amount. The computer-readable storage medium can also store computer-executable instructions to configure the processor to communicate a signal to a carrier responsible for transport of the vehicle. The signal is indicative that the vehicle is released. The computer-executable instructions can further configure the processor to add information based on the signal to the event information.

In another example, the computer-executable instructions can configure the processor to initiate the resolution process by generating a request for correction of the discrepancy and generating support documentation to accompany the request for correction, the support documentation being generated based at least in part on the event information or the set of rules. The computer-executable instructions can further configure the processor to communicate the request for correction and the support documentation to an entity that issues the invoice.

In yet another embodiment, a method for reducing demurrage costs associated with a vehicle is provided. The method can include collecting data indicative of events involving the vehicle; determining an amount of usage of the vehicle based at least in part on the data and a first set of rules; associating an expected charge to the amount of usage based at least in part on a second set of rules; comparing an actual invoice with the expected charge to identify a discrepancy; generating a report based on the data to indicate the discrepancy and support the expected charge; and communicating a refund request and the report to an issuer of the invoice.

According to an example, the first set of rules corresponds to a carrier responsible for movement of the vehicle. In another example, at least the second set of rules corresponds to a customer utilizing the vehicle. Further, collecting the data can include receiving event signals from a vehicle location system.

According to another example, the method can include commencing a clock when the data indicates placement of the vehicle. The method can also include terminating the clock when the data indicates a release of the vehicle. In addition, the method can include suspending the clock when the data indicates an event that, based on one of the first or second sets of rules, specifies a non-chargeable delay.

In one embodiment, a control system (e.g., a vehicle control system) includes at least one electronic input device (e.g., sensor) that is configured to generate event data associated with a vehicle. The at least one electronic input device is positioned along a route of the vehicle and the event data relates to movement of the vehicle. The system further includes one or more processors communicatively coupled with the electronic input device and configured to receive the event data from the electronic input device. The one or more processors are also configured to receive a designated chargeable usage of the vehicle and to determine one or more rules dictating rule-based chargeable usage of the vehicle based on the event data. The one or more processors are also configured to compare the event data with the one or more rules to determine the rule-based chargeable usage of the vehicle and to compare the rule-based chargeable usage with the designated chargeable usage to identify one or more discrepancies between the rule-based chargeable usage and the designated chargeable usage. The one or more rules that dictate the rule-based chargeable usage dynamically change with changing conditions of the vehicle. At least one of the one or more processors is further configured to generate control signals for controlling movement of the vehicle based on at least one of the rule-based chargeable usage of the vehicle or the one or more discrepancies that are identified. The control signals might include signals that are formatted for communication to a vehicle control system onboard the vehicle, with the vehicle control system being configured to control one or more devices onboard the vehicle based on the signals for movement of the vehicle (e.g., throttle control) or other actions relating to vehicle movement (e.g., vehicle scheduling, or other control of a movement-related operational mode or state of the vehicle). For example, relative to how a vehicle was previously controlled/scheduled, the vehicle might be controlled to remain longer or shorter at a given location, to travel to a different location (at a particular time or otherwise), to travel to another location at a different time, to change routes, to travel on a different route, to be included in a different consist, and/or to be moved by a different operator or entity (e.g., included in a different consist that is controlled by the different operator or entity).

In one embodiment, a control system (e.g., demurrage management system) includes one or more processors configured to obtain event data associated with a vehicle. The one or more processors also are configured to receive a designated chargeable usage of the vehicle and to determine one or more rules dictating rule-based chargeable usage of the vehicle based on the event data. The one or more processors compare the event data with the one or more rules to determine the rule-based chargeable usage of the vehicle and compare the rule-based chargeable usage with the designated chargeable usage to identify one or more discrepancies between the rule-based chargeable usage and the designated chargeable usage. The one or more rules that dictate the rule-based chargeable usage dynamically change with changing conditions of the vehicle.

Optionally, the one or more rules dynamically change based on a type of the vehicle, a type of cargo carried by the vehicle, or a user of the vehicle. The one or more processors can be configured to identify different sets of the one or more rules that dynamically change and to combine two or more of the different sets of the one or more rules based on a type of the vehicle, a type of cargo carried by the vehicle, or a user of the vehicle to determine the rule-based chargeable usage.

The event data can represent one or more of entry of the vehicle into a designated area, exit of the vehicle from the designated area, loading of cargo onto the vehicle, unloading of cargo from the vehicle, repair of the vehicle, and/or movement of the vehicle toward the designated area. The event data may be automatically determined by one or more input devices and the processors may be configured to receive the event data from the one or more input devices.

The one or more processors can be configured to, responsive to identifying the one or more discrepancies, change one or more of a condition or state of the vehicle. The one or more processors may be configured to determine a charge for usage of the vehicle based on the rule-based chargeable usage and one or more tariffs. In one example, the one or more processors are configured to, responsive to identifying the one or more discrepancies, change an amount paid by a user of the vehicle for the rule-based chargeable usage of the vehicle.

The designated chargeable usage of the vehicle and the rule-based chargeable usage of the vehicle can represent chargeable periods of time of the vehicle. The designated chargeable usage of the vehicle and the rule-based chargeable usage of the vehicle optionally may represent charges for one or more of demurrage or storage of the vehicle.

In one embodiment, a method includes obtaining event data associated with a vehicle, receiving a designated chargeable usage of the vehicle, determining one or more rules dictating rule-based chargeable usage of the vehicle based on the event data, comparing the event data with the one or more rules to determine the rule-based chargeable usage of the vehicle, comparing the rule-based chargeable usage with the designated chargeable usage to identify one or more discrepancies between the rule-based chargeable usage and the designated chargeable usage (where the one or more rules that dictate the rule-based chargeable usage dynamically change with changing conditions of the vehicle), and, responsive to identifying the one or more discrepancies, changing one or more of a condition or state of the vehicle.

Optionally, the one or more rules dynamically change based on a type of the vehicle, a type of cargo carried by the vehicle, or a user of the vehicle. The method also can include identifying different sets of the one or more rules that dynamically change and combining two or more of the different sets of the one or more rules based on a type of the vehicle, a type of cargo carried by the vehicle, and/or a user of the vehicle to determine the rule-based chargeable usage.

The event data may represent one or more of entry of the vehicle into a designated area, exit of the vehicle from the designated area, loading of cargo onto the vehicle, unloading of cargo from the vehicle, repair of the vehicle, and/or movement of the vehicle toward the designated area.

Obtaining the event data can include automatically determining the event data using one or more input devices. The method optionally may determine a charge for usage of the vehicle based on the rule-based chargeable usage and one or more tariffs. In one example, responsive to identifying the one or more discrepancies, the method may include changing an amount paid by a user of the vehicle for the rule-based chargeable usage of the vehicle.

In one embodiment, a control system (e.g., demurrage management system) includes one or more processors configured to obtain event data associated with a vehicle. The one or more processors are configured to receive a designated chargeable usage of the vehicle and to determine one or more rules dictating rule-based chargeable usage of the vehicle based on the event data. The one or more processors are configured to identify different sets of the one or more rules that dynamically change and to combine two or more of the different sets of the one or more rules based on a type of the vehicle, a type of cargo carried by the vehicle, and/or a user of the vehicle to determine the rule-based chargeable usage. The one or more processors are configured to compare the event data with the one or more rules to determine the rule-based chargeable usage of the vehicle and to compare the rule-based chargeable usage with the designated chargeable usage. The one or more rules that dictate the rule-based chargeable usage dynamically change with changing conditions of the vehicle.

In one example, the event data represents one or more of entry of the vehicle into a designated area, exit of the vehicle from the designated area, loading of cargo onto the vehicle, unloading of cargo from the vehicle, repair of the vehicle, and/or movement of the vehicle toward the designated area. The event data can be automatically determined by one or more input devices and the processors are configured to receive the event data from the one or more input devices. The one or more processors can be configured to, responsive to identifying the one or more discrepancies, change one or more of a condition or state of the vehicle.

In embodiments, a processor as set forth herein may be configured to generate control signals for controlling an electronic device based on at least one of the rule-based chargeable usage of the vehicle or the one or more discrepancies that are identified (i.e., identified from a comparison of the rule-based chargeable usage with the designated chargeable usage). Examples include controlling a non-transitory, computer-readable storage medium for storing information about the rule-based chargeable usage of the vehicle or the one or more discrepancies, controlling a radio, modem, or other electronic communication device to commuincate the information to another location, controlling a printer, display, etc. for auto-generation of a report with the information, controlling a vehicle device (e.g., a device on board a vehicle) relating to vehicle movement, controlling a vehicle device to control a vehicle to a different condition or state, etc.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the inventive subject matter and also to enable one of ordinary skill in the art to practice the inventive subject matter, including making and using a devices or systems and performing incorporated methods. The patentable scope of the inventive subject matter is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A control system comprising:
at least one electronic input device configured to generate event data associated with a vehicle, wherein the at least one electronic input device is positioned along a route of the vehicle and the event data relates to movement of the vehicle; and
one or more processors communicatively coupled with the at least one electronic input device and configured to receive the event data from the at least one electronic input device, the one or more processors also configured to receive a statement including a designated chargeable usage of the vehicle, the statement issued by an entity, and the one or more processors further configured to access one or more rules dictating rule-based chargeable usage of the vehicle,
wherein the one or more processors are configured to compare the event data with the one or more rules to determine the rule-based chargeable usage of the vehicle based on the event data and to compare the rule-based chargeable usage with the designated chargeable usage to identify one or more discrepancies between the rule-based chargeable usage and the designated chargeable usage,
wherein the one or more rules that dictate the rule-based chargeable usage dynamically change with changing conditions of the vehicle,
and wherein the one or more processors are further configured to generate a reconciliation request for correcting the one or more discrepancies that are identified and to communicate the reconciliation request to the entity that issued the statement, the reconciliation request including a request for adjustment of the designated chargeable usage and evidentiary support for the rule-based chargeable usage based at least in part on the event data.

2. A control system comprising:
one or more processors configured to obtain event data associated with a vehicle, the one or more processors also configured to receive a statement including a designated chargeable usage of the vehicle, the statement issued by an entity, the one or more processors further configured to access one or more rules dictating rule-based chargeable usage of the vehicle,
wherein the one or more processors are configured to compare the event data with the one or more rules to determine the rule-based chargeable usage of the vehicle based on the event data and to compare the rule-based chargeable usage with the designated chargeable usage to identify one or more discrepancies between the rule-based chargeable usage and the designated chargeable usage, wherein the one or more rules that dictate the rule-based chargeable usage dynamically change with changing conditions of the vehicle,
wherein the one or more processors are configured to, responsive to identifying the one or more discrepancies, generate a reconciliation request for correcting the one or more discrepancies and communicate the reconciliation request to the entity that issued the statement, the reconciliation request including evidentiary support for the rule-based chargeable usage based at least in part on the event data and the one or more rules.

3. The control system of claim 2, wherein at least one of the one or more processors is further configured to generate control signals for controlling an electronic device based on at least one of the rule-based chargeable usage of the vehicle or the one or more discrepancies that are identified.

4. The control system of claim 2, wherein the one or more rules dynamically change based on a type of the vehicle, a type of cargo carried by the vehicle, or a user of the vehicle.

5. The control system of claim 2, wherein the one or more processors are configured to identify different sets of the one or more rules that dynamically change and to combine two or more of the different sets of the one or more rules based on a type of the vehicle, a type of cargo carried by the vehicle, or a user of the vehicle to determine the rule-based chargeable usage.

6. The control system of claim 2, wherein the one or more processors are configured to determine a charge for usage of the vehicle based on the rule-based chargeable usage and one or more tariffs.

7. The control system of claim 2, wherein the one or more processors are configured to, responsive to identifying the one or more discrepancies, change an amount paid by a user of the vehicle for the rule-based chargeable usage of the vehicle.

8. The control system of claim 2, wherein the designated chargeable usage of the vehicle and the rule-based chargeable usage of the vehicle represent charges for one or more of demurrage or storage of the vehicle.

9. The control system of claim 2, further comprising a computer-readable storage medium operably connected to the one or more processors, wherein the one or more rules are stored in the computer-readable storage medium and the one or more processors are configured to access the one or more rules from the computer-readable storage medium.

10. The control system of claim 2, wherein event data indicates an amount of usage of the vehicle, and the one or more processors are configured to compare the event data with the one or more rules to determine the rule-based chargeable usage of the vehicle by increasing or decreasing the amount of usage based on one or more exceptions, events, or circumstances identified in the event data that correspond with at least one rule of the one or more rules.

11. The control system of claim 2, wherein the evidentiary support for the rule-based chargeable usage is based on sensor signals generated by one or more sensors disposed onboard the vehicle.

12. The control system of claim 2, wherein the event data represents one or more of entry of the vehicle into a designated area, exit of the vehicle from the designated area, loading of cargo onto the vehicle, unloading of cargo from the vehicle, repair of the vehicle, or movement of the vehicle toward the designated area.

13. The control system of claim 12, wherein the event data is automatically determined by one or more input devices and the one or more processors are configured to receive the event data from the one or more input devices.

14. The control system of claim 13, wherein the one or more input devices includes a vehicle location device disposed onboard the vehicle, the vehicle location device configured to determine a location of the vehicle and to communicate the location to the one or more processors, wherein the one or more processors are configured to determine one or more of when the entry of the vehicle into the designated area occurs or when the exit of the vehicle from the designated area occurs based on the location of the vehicle received from the vehicle location device.

15. A method comprising:
obtaining event data associated with a vehicle;
receiving a statement including a designated chargeable usage of the vehicle, the statement issued by an entity;
accessing one or more rules dictating rule-based chargeable usage of the vehicle;
comparing the event data with the one or more rules to determine the rule-based chargeable usage of the vehicle based on the event data;
comparing the rule-based chargeable usage with the designated chargeable usage to identify one or more discrepancies between the rule-based chargeable usage and the designated chargeable usage, wherein the one or more rules that dictate the rule-based chargeable usage dynamically change with changing conditions of the vehicle; and
responsive to identifying the one or more discrepancies, generating a reconciliation request for correcting the one or more discrepancies and communicating the reconciliation request to the entity that issued the statement, the reconciliation request including evidentiary support for the rule-based chargeable usage based at least in part on the event data and the one or more rules.

16. The method of claim 15, wherein the one or more rules dynamically change based on a type of the vehicle, a type of cargo carried by the vehicle, or a user of the vehicle.

17. The method of claim 15, further comprising:
identifying different sets of the one or more rules that dynamically change; and
combining two or more of the different sets of the one or more rules based on a type of the vehicle, a type of cargo carried by the vehicle, or a user of the vehicle to determine the rule-based chargeable usage.

18. The method of claim 15, wherein the event data represents one or more of entry of the vehicle into a designated area, exit of the vehicle from the designated area, loading of cargo onto the vehicle, unloading of cargo from the vehicle, repair of the vehicle, or movement of the vehicle toward the designated area.

19. The method of claim 18, wherein obtaining the event data includes automatically determining the event data using one or more input devices.

20. A control system comprising:
one or more processors configured to obtain event data associated with a vehicle, the one or more processors also configured to receive a statement including a designated chargeable usage of the vehicle, the statement issued by an entity, the one or more processors further configured to access one or more rules dictating rule-based chargeable usage of the vehicle,
wherein the one or more processors are configured to identify different sets of the one or more rules that dynamically change and to combine two or more of the different sets of the one or more rules based on a type of the vehicle, a type of cargo carried by the vehicle, or a user of the vehicle to determine the rule-based chargeable usage,
and wherein the one or more processors are configured to compare the event data with the one or more rules to determine the rule-based chargeable usage of the vehicle based on the event data and to compare the rule-based chargeable usage with the designated chargeable usage, wherein the one or more rules that dictate the rule-based chargeable usage dynamically change with changing conditions of the vehicle,
wherein the one or more processors are configured to, responsive to identifying one or more discrepancies between the rule-based chargeable usage and the designated chargeable usage, generate a reconciliation request based on the one or more discrepancies and to communicate the reconciliation request to the entity that issued the statement, the reconciliation request including a request for adjustment of the designated chargeable usage of the vehicle and evidentiary support for the rule-based chargeable usage based at least in part on the event data.

21. The control system of claim 20, wherein the event data represents one or more of entry of the vehicle into a designated area, exit of the vehicle from the designated area, loading of cargo onto the vehicle, unloading of cargo from the vehicle, repair of the vehicle, or movement of the vehicle toward the designated area, and wherein the event data is automatically determined by one or more input devices and the one or more processors are configured to receive the event data from the one or more input devices.

22. The control system of claim 20, wherein the evidentiary support for the rule-based chargeable usage includes a report that indicates a timeline of events for the vehicle.

* * * * *